US011113491B2

(12) United States Patent
Whelan et al.

(10) Patent No.: US 11,113,491 B2
(45) Date of Patent: Sep. 7, 2021

(54) METHODS FOR VIRTUAL MULTI-DIMENSIONAL QUICK RESPONSE CODES

(71) Applicant: The Boeing Company, Chicago, IL (US)

(72) Inventors: John Desmond Whelan, Burien, WA (US); Matthew R. Pope, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/732,942

(22) Filed: Jan. 2, 2020

(65) Prior Publication Data
US 2021/0209322 A1 Jul. 8, 2021

(51) Int. Cl.
*G06K 7/14* (2006.01)
*G06K 7/10* (2006.01)

(52) U.S. Cl.
CPC ....... *G06K 7/1417* (2013.01); *G06K 7/10722* (2013.01)

(58) Field of Classification Search
CPC .......... G06K 7/1417; G06K 7/10722
USPC ......... 235/462.11, 375, 383, 462.01
See application file for complete search history.

(56) References Cited

U.S. PATENT DOCUMENTS

| | | | |
|---|---|---|---|
| 2006/0282331 A1* | 12/2006 | Jacobs | G07G 1/0054 705/22 |
| 2007/0017992 A1* | 1/2007 | Burger | G06K 7/1095 235/462.01 |
| 2010/0198876 A1* | 8/2010 | Estok | G06F 16/58 707/793 |
| 2012/0000978 A1* | 1/2012 | Rollyson | G06Q 30/06 235/383 |
| 2016/0148083 A1* | 5/2016 | Osborne | G06K 7/10722 235/375 |
| 2016/0334276 A1* | 11/2016 | Pluvinage | G01J 3/28 |
| 2018/0240310 A1* | 8/2018 | Watanabe | G07G 1/0027 |
| 2020/0104821 A1* | 4/2020 | Ichikawa | G06Q 20/327 |

\* cited by examiner

*Primary Examiner* — Allyson N Trail
(74) *Attorney, Agent, or Firm* — Kwan & Olynick LLP

(57) ABSTRACT

Described are methods and systems for Virtual Multi-Dimensional Quick Response (VMDQR) codes, used for transferring data sets between code initialization devices and code retrieval devices, such as smartphones and other like devices. A VMDQR code is capable of encoding and sharing large amounts of data, regardless of the space available on an object. The amount of the encoded data depends on the dimensionality of the VMDQR code. A VMDQR code is incorporated into an augmented image, presented on a user interface of a code retrieval device. For example, an image of a real object, which does not have any physical codes, is augmented by adding a VMDQR code to give a representation of an object with a code. The VMDQR code is then scanned from the user interface using a scanner to transfer the encoded data to the scanner.

20 Claims, 12 Drawing Sheets

METHODS FOR VIRTUAL MULTI-DIMENSIONAL QUICK RESPONSE CODES

BACKGROUND

Barcodes are widely used for encoding various types of information, such serial numbers, universal product codes, and the like. A typical barcode is a physical feature (e.g., a label or a print), placed on an object and optically scanned by a specialized device (e.g., a scanner) to retrieve and decode the information in the barcode. Some examples of barcodes are linear barcodes and quick response (QR) codes. However, these conventional codes have various limitations, such as being able to encode limited amount of information, determined by the type and the size of the codes. Another problem with conventional codes relates to the surface one applies them to. In many cases, these surfaces are not sufficient for external labels. For example, a surface area could contain non-adhesive materials. In some situations, one might need to apply a code in multiple areas, such as within an assembly line, making the task very cumbersome or physically impossible. Another short coming of a conventional code is once applied; the code is visible to everyone. It might be necessary to allow only certain groups access to these codes and or prohibit others.

As data becomes more abundant and more security requirements are imposed on various types of data, conventional barcodes are simply not capable of supporting many new applications. Furthermore, placing and maintaining physical barcodes, such as labels or prints, can be difficult. For example, some objects are too small to contain a physical barcode and/or have curved surfaces or surfaces that are difficult to bond to or print on. Also, once a physical barcode is created, updating information on this barcode is difficult and typically required creating a new physical barcode and replacing the original barcode with the new one. Finally, physical barcodes are visible and available for scanning to everyone. Limiting encoded information to selected users is generally not possible due to the overt nature of the physical barcodes.

While various solutions have been proposed to limit or compress the encoded data, these solutions still have many challenges. For example, data compression algorithms have limited capabilities. Encoded links, e.g., uniform resource locators (URLs), to external data storages need security and authentication measures within these links, which can easily cause the code to increase its size.

What is needed are novel methods and systems for effectively and selectively managing information encoded on barcodes, regardless of available space and surface conditions, while utilizing conventional scanners.

SUMMARY

Described are methods and systems for Virtual Multi-Dimensional Quick Response (VMDQR) codes, used for transferring data sets between code initialization devices and code retrieval devices, such as smartphones and other like devices. A VMDQR code is capable of encoding and sharing large amounts of data, regardless of the space available on an object. The amount of the encoded data depends on the dimensionality of the VMDQR code. A VMDQR code is incorporated into an augmented image, presented on a user interface of a code retrieval device. For example, an image of a real object, which does not have any physical codes, is augmented by adding a VMDQR code to give a representation of an object with a code. The VMDQR code is then scanned from the user interface using a scanner to transfer the encoded data to the scanner.

In some examples, a method of using a VMDQR code comprises obtaining a process image of a process object at a code retrieval device, identifying process image reference points in the process image using the code retrieval device, and transmitting the process image reference points from the code retrieval device to a code management device, for verification by the code management device. Based on the verification of the process image reference points by the code management device, the method proceeds with receiving the VMDQR code from the code management device at the code retrieval device, incorporating the VMDQR code into the process image based on the process image reference points to generate a process code-integrated image, and displaying the process code-integrated image, comprising the VMDQR code, on the code retrieval device.

In some examples, a method of using a VMDQR code comprises obtaining an initialization image of an initialization object at a code initialization device. The initialization object comprises initialization object reference points. The method proceeds with identifying initialization image reference points in the initialization image using the code initialization device. The initialization image reference points correspond to the initialization object reference points. The method continues with receiving a data set at the code initialization device, such that the data set is associated with the initialization object. The method proceeds with transmitting the initialization image reference points and the data set to a code management device for generating the VMDQR code based on the data set and for positioning the VMDQR code in accordance with the initialization image reference points.

In some examples, a method of using a VMDQR code comprises receiving an initialization image reference points and data set from a code initialization device, generating the VMDQR code based on the data set, storing the VMDQR code and the initialization image reference points in a code management database, receiving process image reference points from a code retrieval device, determining if the process image reference points corresponds to the initialization image reference points, and, if the process image reference points correspond to the initialization image reference points, transmitting the VMDQR code to the code retrieval device.

DETAILED DESCRIPTION

Figure 1A:
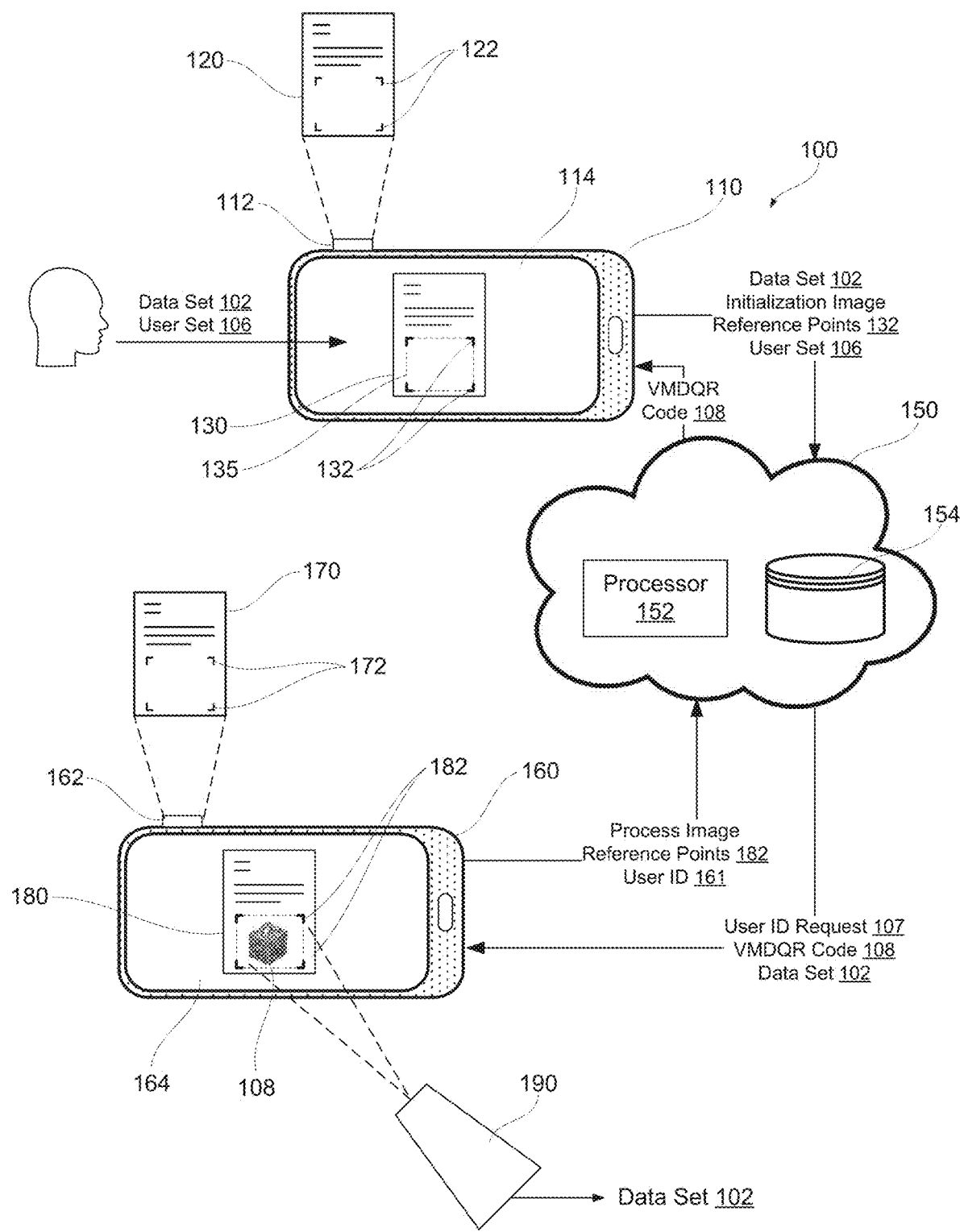
FIG. 1A is a schematic representation of a system for using VMDQR codes, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Methods and systems, described herein, utilize VMDQR codes to transfer information between different components of these systems. Unlike conventional barcodes, VMDQR codes are not physical codes and are not present in the physical form (e.g., as labels or prints). Instead, a VMDQR code is presented on a user interface of a device to augment an image of a physical object, with which this VMDQR code is associated. More specifically, the user interface displays an augmented image, in which the image of the physical object appears together with the image of the VMDQR code, e.g., to appear that the physical object has the VMDQR code. However, in real life, the physical object does not have any such codes. As a result, the object size, the surface curvature, the surface adhesion, and other challenges typically associated with physical barcodes do not present any issues in the described methods and systems. Furthermore, generating, maintaining, updating, and scanning VMDQR codes are simplified in comparison to conventional barcodes. VMDQR codes also provide various features, which are not available or possible with conventional barcodes, such as limiting visibility of VMDQR codes. For example, the ability to retrieve and view VMDQR codes is available to a selected set of users (unlike physical barcodes that are visible to everyone). While all users are able to see an object and capture images of this object, only the selected users will see augmented images, with the VMDQR codes added to the object images.

In some examples, VMDQR codes are generated and managed by code management devices, which are communicatively coupled to code initialization devices and code retrieval devices (e.g., using internet). Various types of secure connections between these devices (e.g., encrypted transport layer) are within the scope. These code management devices may be also referred to as external storage devices, to differentiate these server-type devices from various user devices, e.g., used to interact with objects.

To generate a VMDQR code, a code initialization device captures an image of the object and identifies one or more reference points in this image. These reference points are used to define a location of the VMDQR code in the augmented image, which may be also referred to as a code area. In some examples, the code area (in the initialization image and, later, in the augmented image) has a corresponding area on the physical object, e.g., a surface portion of the physical object. Alternatively, the code area corresponds to a physical area adjacent to the physical object, e.g., if the physical object is small. Furthermore, in some example, the code area corresponds to an intangible location, e.g., within an email. The reference points are then transferred to a code management device. Furthermore, the reference points are used as "locks" and "keys" for retrieving the VMDQR code as further described below.

Another component used for generating the VMDQR code is a data set, which is encoded into the VMDQR code. The data set comprises various information, e.g., associated with the object in an augmented image. Some examples of information in the data set includes, but are not limited to, product description, serial number, universal product code, one or more dates (e.g., manufacturing date, expiration date, and the like), price/discount, processing instructions, and the like. The data set is provided to a code management device, together with corresponding initialization image reference points.

In some examples, the code management device also receives a user set, identifying one or more users with and/or without access to the VMDQR code. For example, some users are excluded from viewing the VMDQR code, even though these users have provided image reference points to the code management device. These users will not see an augmented image, in which the VMDQR code is added to the object image.

The reference points, the data set, and, in some examples, the user set are transmitted to a code management device, which generates the VMDQR code based on the data set. The VMDQR code and the reference points and, in some examples, the user set and/or the data set are stored in the code management device. The reference points are operable as a lock for the VMDQR code.

To retrieve a VMDQR code, a code retrieval device captures an image of an object, which is the same object, as described above and used to generate the initial reference points, or a different (but similar) object. The code retrieval device then identifies new reference points in the captured image and transmits these reference points to the code management device. These new reference points are operable as a key. The code management device searches through sets of reference points in the database to determine any corresponding set, e.g., if the provided "key" can unlock any of the "locks" available at the code management device. Each set of reference points in the database has a corresponding VMDQR code, created earlier. If the corresponding set is found, in some examples, the code management device also checks the user set corresponding to this VMDQR code for authorization, e.g., if the requesting device is authorized to receive this particular VMDQR code. Assuming the requesting device is authorized or no authorization is required, the VMDQR code is transmitted to the requesting device, which displays the VMDQR code as a part of an augmented image. Specifically, the augmented image comprises the original captured image and the VMDQR code, superimposed into the original image in a code area, associated with the reference points. The VMDQR code is then scanned by a scanner to obtain the data set, encoded in the VMDQR code.

In some examples, code initialization devices and code retrieval devices are camera-equipped device with communication capabilities, such as smartphones. These code initialization devices and code retrieval devices are equipped with corresponding program products (e.g., applications) for performing various operations, described herein. For examples, these program products are managed by a code management device, as a part of the overall service.

System Examples

FIG. 1A is a schematic illustration of system 100 for using VMDQR codes, in accordance with some embodiments. System 100 comprises code initialization device 110, code management device 150, and code retrieval device 160. While one instance of each device type is shown in FIG. 1A, one having ordinary skill in the art would understand that any number of each device type is within the scope. Code management device 150 is communicative coupled with each of code initialization device 110 and code retrieval device 160, e.g., using a communication network, such as internet.

As shown in FIG. 1A, code initialization device 110 is used to obtain initialization image 130 of initialization object 120. Initialization object 120 is any object, which a user of code initialization device 110 is interested to associate with VMDQR code 108. Some examples of initialization object 120 include, but are not limited to, a poster, a price tag, a manufactured component, and the like. Initialization object 120 comprises initialization object reference points 122, which are specific physical feature of initialization object 120, such as markings, edges, and the like. Initialization object reference points 122 are presented as initialization image reference points 132 in initialization image 130. Unlike objects that receive conventional physical barcodes, initialization object 120 does not need to have any particular size, surface, or other requirements. In general, any object can be used as initialization object 120.

Code initialization device 110 identifies initialization image reference points 132 in initialization image 130. Initialization image reference points 132 are later used for determining initialization code area 135 in initialization image 130 and (e.g., as "locks") for retrieving VMDQR code 108 from code management device 150. Code initialization device 110 also obtains data set 102, which is later encoded into VMDQR code 108. For example, the user is prompted to enter information on code initialization user interface 114 of code initialization device 110. In some examples, the user also provides user set 106, indicating authorization for accessing VMDQR code 108.

Initialization image reference points 132, data set 102, and (optionally) user set 106 are transferred to code management device 150. Code management device 150, using code management processor 152, encodes data set 102 into VMDQR code 108 and stores VMDQR code 108 in code management database 154. When user set 106 is also transferred, user set 106 is also stored in code management database 154. In some examples, data set 102 is also stored in code management database 154, in addition to VMDQR code 108.

Figure 1B:
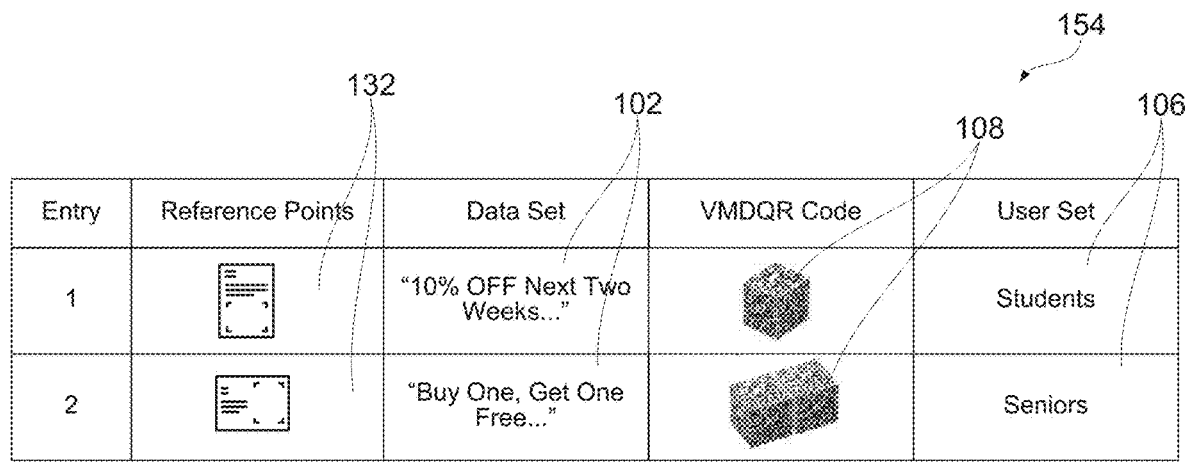
FIG. 1B is a schematic representation of a code management database, in accordance with some examples.

FIG. 1B is a schematic representation of code management database 154, in accordance with some examples. While two entries are shown, one having ordinary skill in the art would understand that code management database 154 is operable to store any number of entries. Each entry comprises initialization image reference points 132, VMDQR code 108, and, in some examples, user set 106. Furthermore, in some examples, data set 102 is also stored in the entry, in addition to VMDQR code 108. Initialization image reference points 132 are stored in the form of coordinates and/or other identification, images, and the like. Initialization image reference points 132 are used as a key for retrieval other components of the entry as further described below. VMDQR code 108 is stored as a three dimensional image.

Figure 1C:
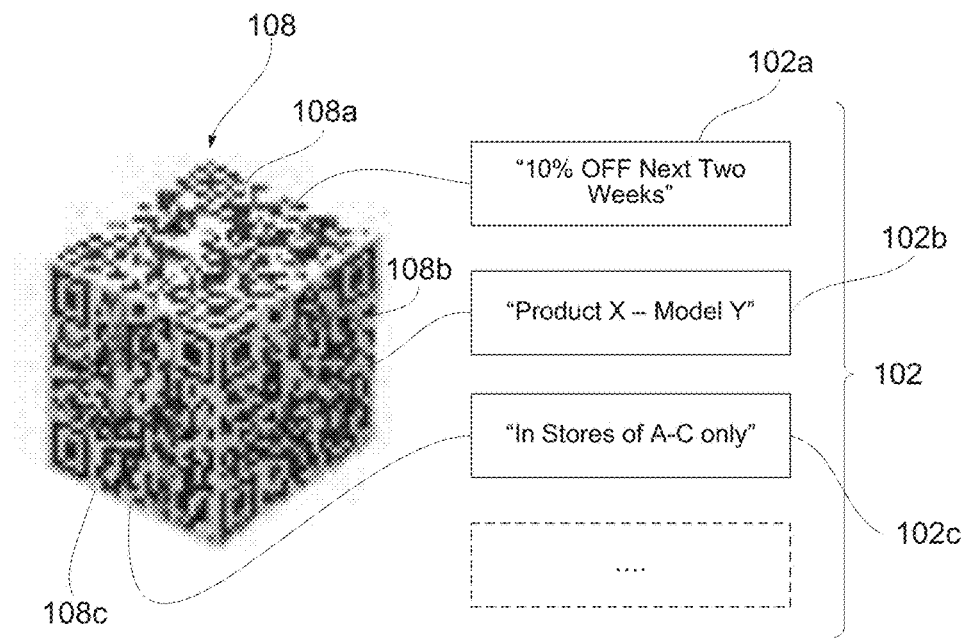
FIG. 1C is a schematic representation of a VMDQR code and components of the VMDQR code, in accordance with some examples.
Figure 5A:
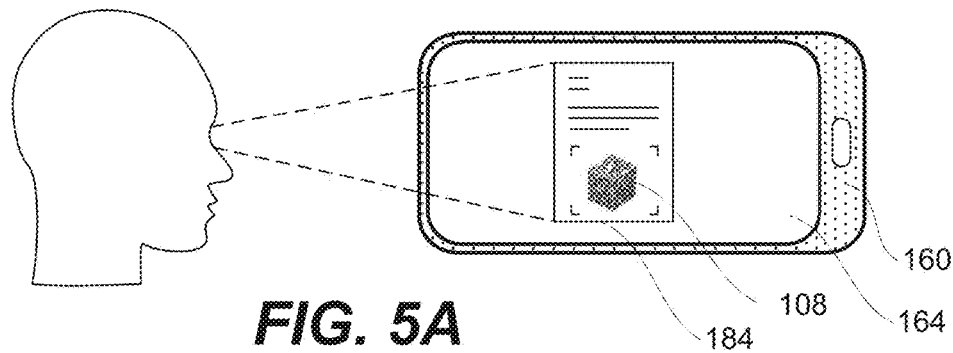
FIG. 5A-FIG. 5D are schematic representations of different stages of using a code retrieval device for displaying and scanning a VMDQR code, in accordance with some examples.
Figure 5B:
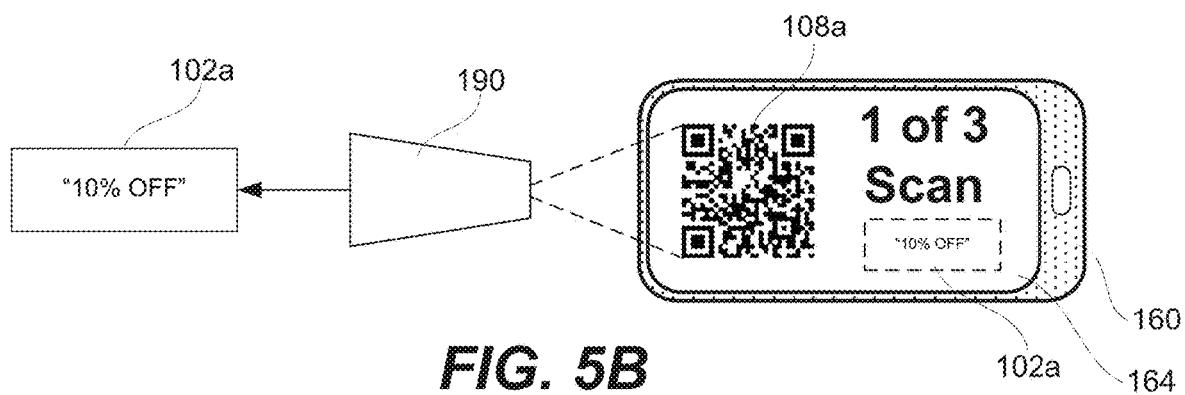
Figure 5C:
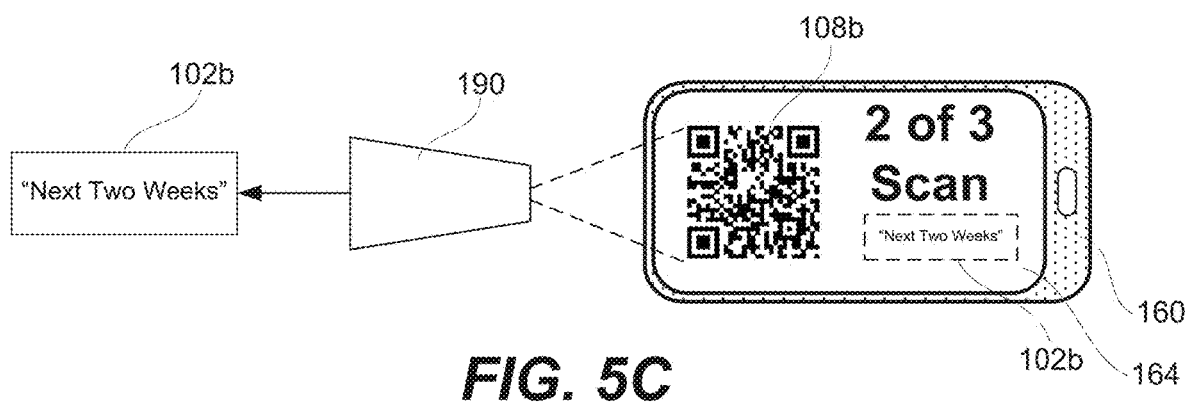
Figure 5D:
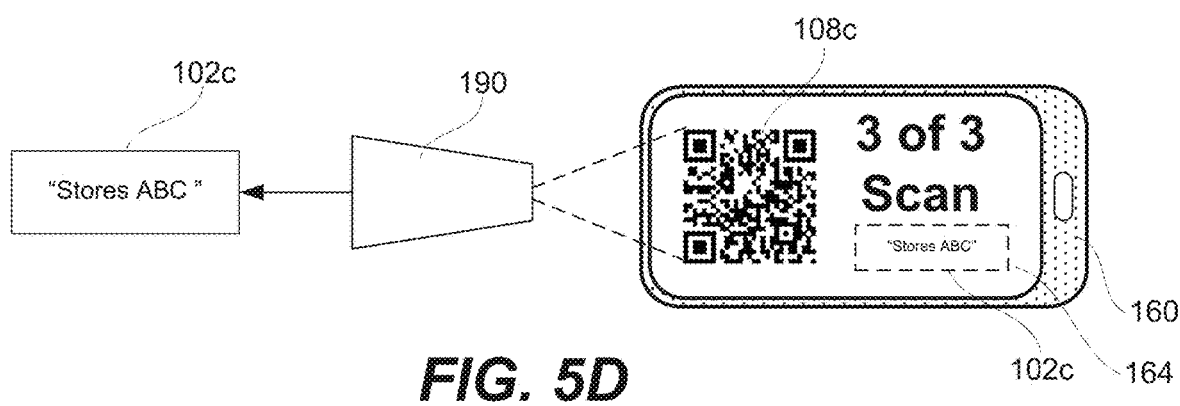
Figure 6:
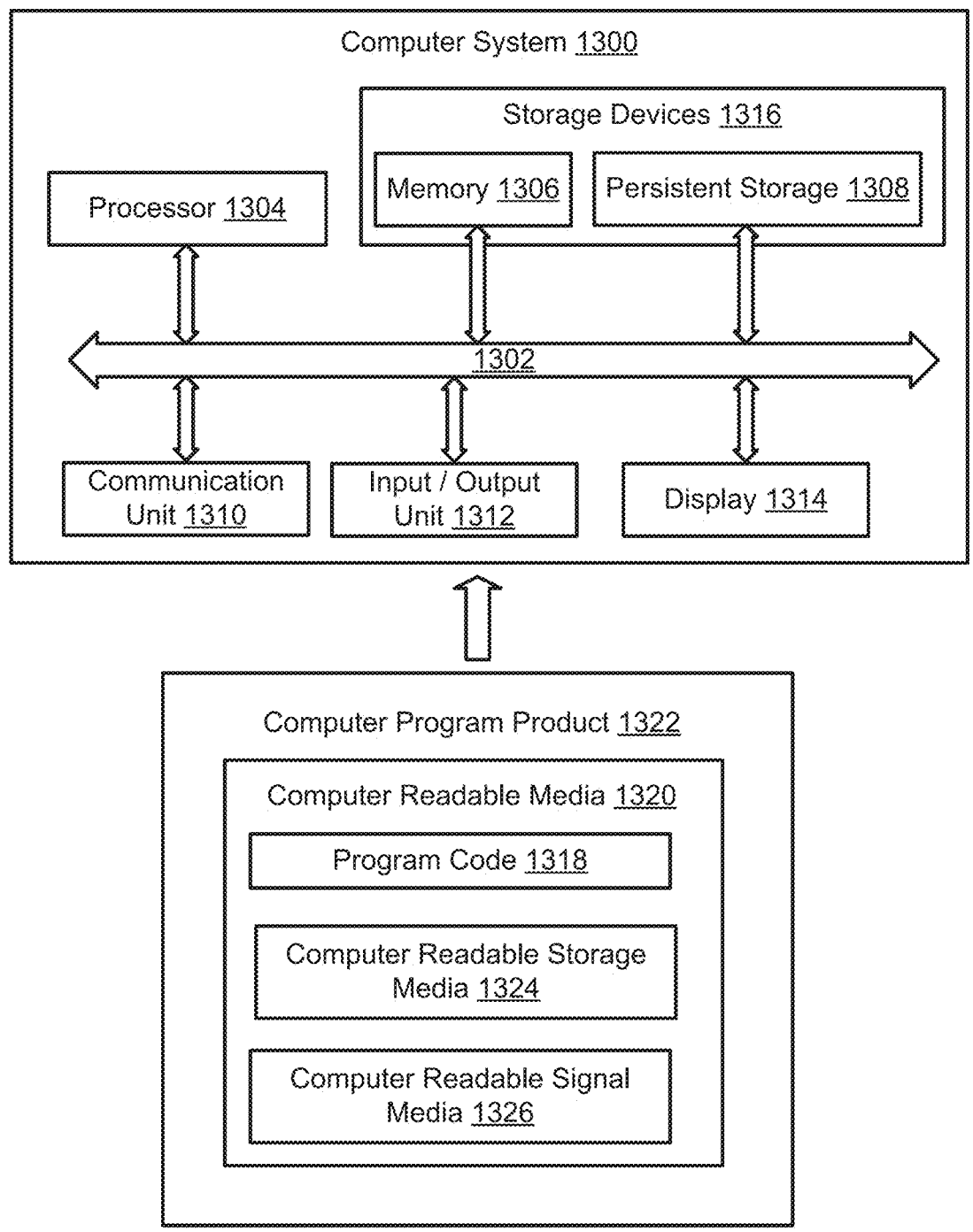
FIG. 6 is a schematic representation of a computer system, operable as one of components of the system for using VMDQR codes, in accordance with some examples.

FIG. 1C is a schematic representation of VMDQR code 108, in accordance with some examples. VMDQR code 108 comprises at least two QR codes, such as first QR code 108*a*, second QR code 108*b*, and third QR code 108*c*. System 100 comprises information about the order, with which these QR code are arranged into VMDQR code 108. This order is used by code retrieval device 160 to display individual QR code, while decoding data set 102, as further described below. While three QR codes are shown and identified in FIG. 1C, one having ordinary skill in the art would understand that any number (two or more) of QR codes are within the scope. The number of QR codes, corresponding to VMDQR code 108, may be referred to as a dimensionality of VMDQR code 108. For example, VMDQR code 108 with three QR codes may be referred to as a three-dimensional code, while VMDQR code 108 with six QR codes may be referred to as a six-dimensional code. Overall, in some examples, VMDQR code 108 is a two-dimensional code, a three-dimensional code, a four-dimensional code, and so on. The dimensionality of VMDQR code 108 should not be confused with an image representing VMDQR code 108. In some examples, the image showing VMDQR code 108 is a three-dimensional images (e.g., as shown in FIG. 1C and FIG. 5A) or a two-dimensional mage (e.g., as shown in FIG. 5B, FIG. 5C, and FIG. 5D).

Referring to FIG. 1B, VMDQR code 108 of the first entry is shown as a cube, which is capable of supporting up to six QR codes. VMDQR code 108 of the second entry is shown as two adjacent cubes, which are capable of supporting up to ten QR codes. Other arrangements of cubes and other figures are also within the scope. The three-dimensional image of VMDQR code 108 provides some indication of the dimensionality of VMDQR code 108 and, to some extent, its ability to store data.

While this disclosure focuses on VMDQR code 108 and its components, e.g., QR codes, other types of virtual multi-dimensional codes are also within the scope. In some examples, multiple linear barcodes or other types of barcodes are arranged into a virtual multi-dimensional linear barcode.

Each QR code of VMDQR code 108 encodes a corresponding data portion of data set 102. As schematically shown in FIG. 1C, first data portion 102*a* is encoded as first QR code 108*a*, second data portion 102*b* is encoded as second QR code 108*b*, and third data portion 102*c* is encoded as third QR code 108*c*. In some examples, each QR code of VMDQR code 108 is scanned independently to retrieve the corresponding data portion. When all data portions are retrieved from VMDQR code 108, these data portions are aggregated back into data set 102 thereby enabling transfer of effectively any size of data.

Returning to FIG. 1A, code retrieval device 160 captures process image 180 of process object 170, which comprises process object reference points 172. Code retrieval device 160 identifies process image reference points 182, corresponding to process object reference points 172, in process image 180. In some examples, process object 170 is the same as or different from initialization object 120. At least, process object 170 and initialization object 120 are similar. More importantly, process object reference points 172 corresponds to initialization object reference points 122. Furthermore, in some examples, process object 170 identifies potential availability of VMDQR code 108, thereby prompting the user of code retrieval device 160 to capture process image 180 of process object 170.

Code retrieval device 160 then transmits process image reference points 182 to code management device 150, which in turn compares process image reference points 182 to various sets of initialization image reference points 132 available in code management database 154. In other words, process image reference points 182 are operable as a key, while initialization image reference points 132 are operable as a lock. If a matching set of initialization image reference points 132 is found, code management device 150 then determines if user authentication is needed, e.g., if the matching set of initialization image reference points 132 has user set 106. If user authentication is needed, code management device 150 transmits user identification request 107 to code retrieval device 160. In response, code retrieval device 160 transmits user identification 161, which code management device 150 authenticates based on user set 106. If the authentication is positive or if the authentication is not needed, code management device 150 transmits VMDQR code 108 and, in some examples, data set 102 to code retrieval device 160.

Upon receipt of VMDQR code 108 from code management device 150, process image 180 is augmented by code retrieval device 160 to incorporate VMDQR code 108 thereby creating process code-integrated image 184. Process code-integrated image 184 may be also referred to as an augmented image. Process code-integrated image 184 is displayed on code retrieval device 160 and can be viewed by user and/or scanned by scanner 190, e.g., to retrieve data set.

Figure 1E:
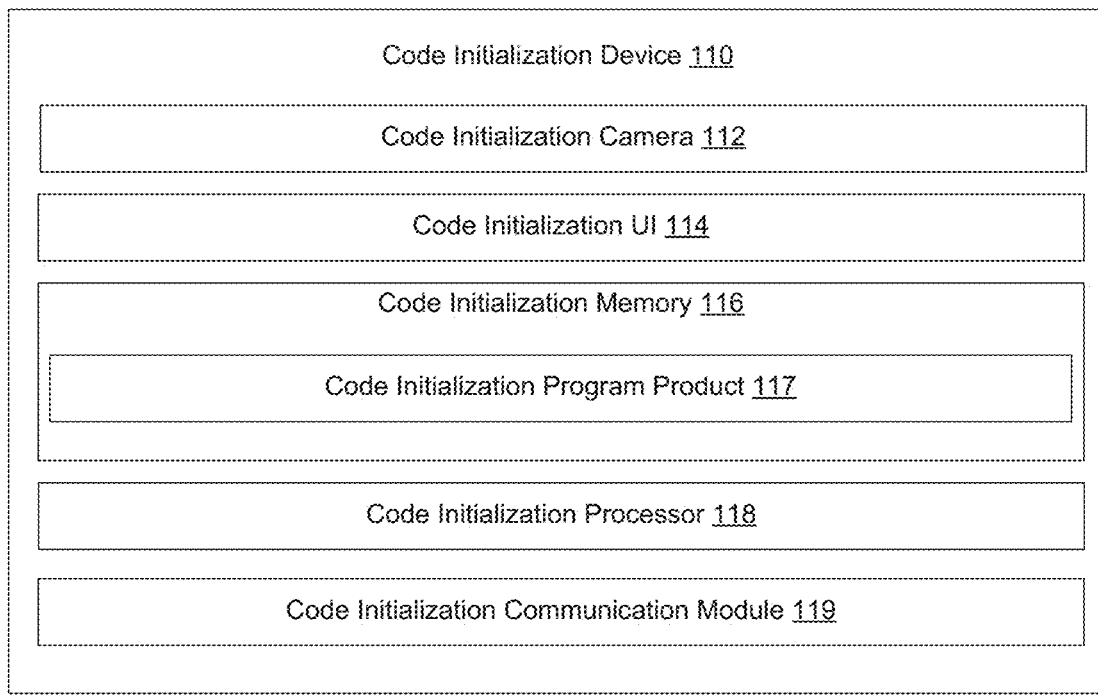
FIG. 1E is a schematic representation of a code initialization device, in accordance with some examples.

Various features and operations of system 100 are enabled by code initialization device 110 and code retrieval device 160. FIG. 1E is a schematic representation of various components of code initialization device 110, in accordance with some examples. Specifically, code initialization device 110 comprises code initialization camera 112, e.g., used for capturing initialization image 130. Code initialization device 110 also comprises code initialization user interface 114, e.g., used for displaying initialization image 130 and any augmented images. In some examples, code initialization user interface 114 is also used for entering data set 102 and, optionally, user set 106. Code initialization device 110 also comprises code initialization memory 116, e.g., for storing code initialization program product 117. Code initialization program product 117 is executed by code initialization processor 118 of code initialization device 110 to perform various operations of code initialization device 110 described herein, in particular, with reference to FIG. 2A. Finally, code initialization device 110 also comprises code initialization communication module 119, e.g., to communicatively couple code initialization device 110 to code management device 150.

Figure 1F:
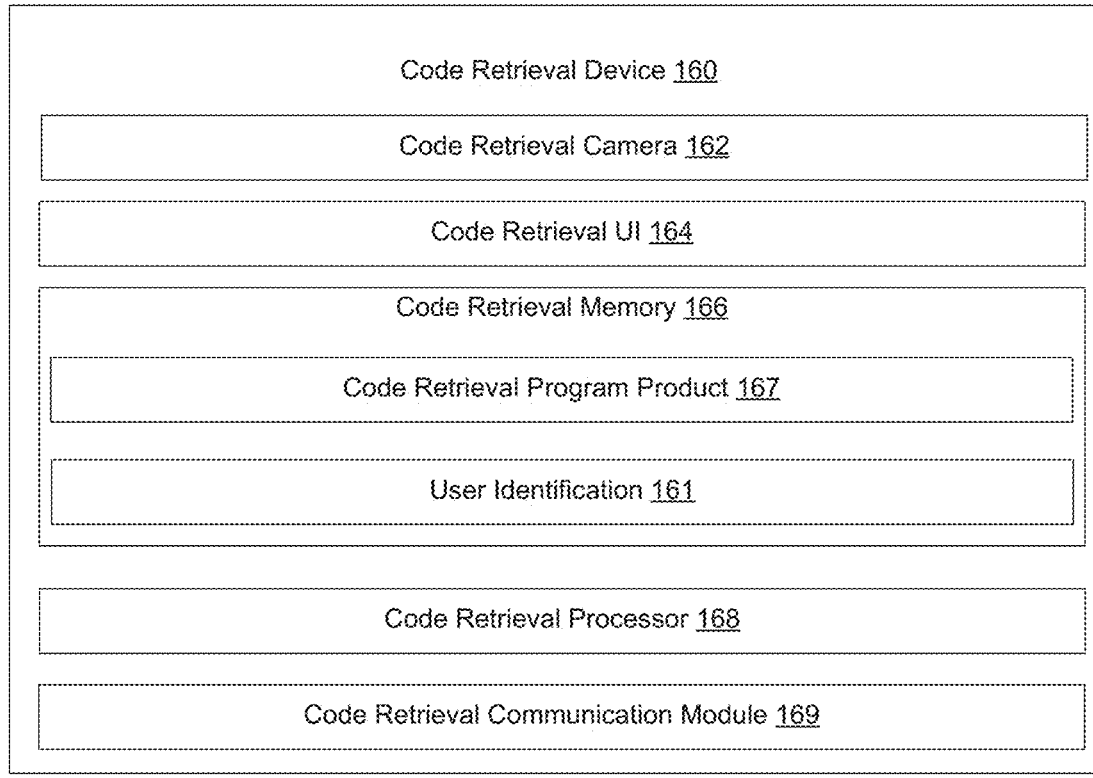
FIG. 1F is a schematic representation of a code retrieval device, in accordance with some examples.

FIG. 1F is a schematic representation of various components of code retrieval device 160, in accordance with some examples. Specifically, code retrieval device 160 comprises code retrieval camera 162, e.g., used for capturing process image 180. Code retrieval device 160 also comprises code retrieval user interface 164, e.g., used for displaying process image 180 and any augmented images. Code retrieval device 160 also comprises code retrieval memory 166, e.g., used for storing code retrieval program product 167. Code retrieval program product 167 is executed by code retrieval processor 168 of code retrieval device 160 to perform various operations described herein and, in particular, with reference to FIG. 2C and FIG. 2D. Finally, code retrieval device 160 also comprises code retrieval communication module 169, e.g., to communicatively couple to code management device 150.

Examples of Methods Using VMDQR Codes with Code Initialization Devices

Figure 2A:
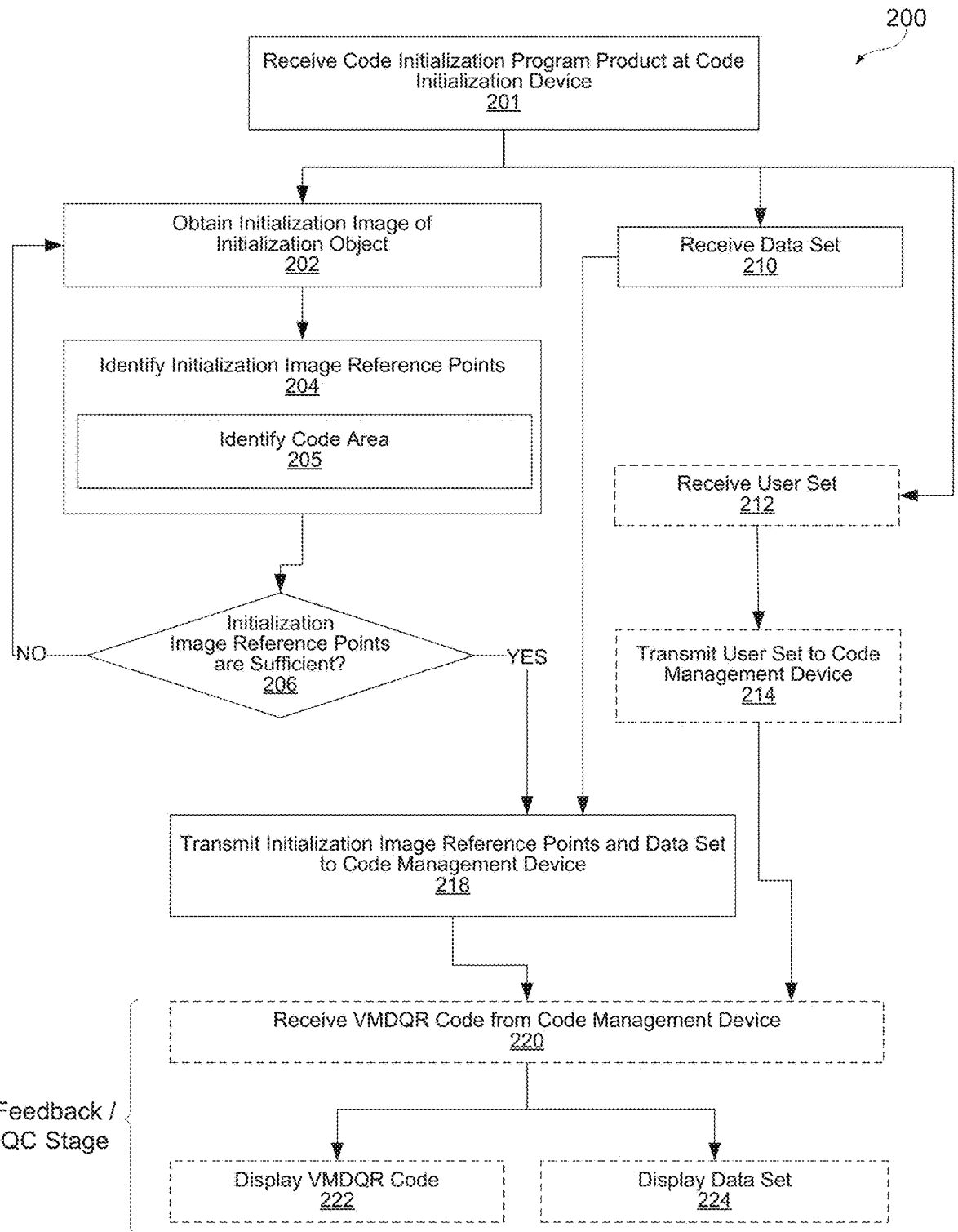
FIG. 2A-FIG. 2D are process flowcharts corresponding to various methods of using VMDQR codes, in accordance with some examples.

FIG. 2A is a process flowchart corresponding to method 200, in which VMDQR code 108 is used to transfer information between different devices. Various examples of VMDQR code 108 are described above with reference to FIG. 1C. VMDQR code 108 combines multiple QR codes and, therefore, is able to store more data than a conventional QR code.

In some examples, method 200 commences with receiving code initialization program product 117 at code initialization device 110 (block 201 in FIG. 2A). For example, code initialization program product 117 is an application, which is downloaded from a server associated with method 200, e.g., from code management device 150. The application is installed on code initialization device 110 and enables various operations of method 200, further described below. Various examples and features of code initialization device 110 are described above with reference to FIG. 1E.

Method 200 comprises obtaining initialization image 130 of initialization object 120 at code initialization device 110 (block 202 in FIG. 2A). Initialization image 130 is obtained using code initialization camera 112 of code initialization device 110 as, for example, is schematically shown in FIG. 3A. In some examples, initialization object 120 comprises some indication about potential availability of VMDQR code 108 associated with initialization object 120. For example, initialization object 120 comprises instructions for retrieving VMDQR code 108 and initiating method 260, further described below with reference to FIG. 2C.

In some examples, method 200 comprises displaying a prompt for locating initialization object 120, e.g., for obtaining initialization image 130. For example, code initialization device 110 displays one or more examples of initialization objects for a user to identify the actual object in his/her environment. Furthermore, in some examples, the prompt is developed based on a geolocation of code initialization device 110 and information about the location of initialization object 120. In other words, a user of code initialization device 110 is directed to initialization object 120. Furthermore, in some examples, method 200 comprises displaying instructions for obtaining initialization image 130.

Method 200 comprises identifying initialization image reference points 132 in initialization image 130 using code initialization device 110 (block 204 in FIG. 2A). For examples, various visual features (e.g., lines, corner markings, and the like) can be used as initialization image reference points 132. In some examples, initialization image reference points 132 are identified based on changes in contrast of initialization image reference points 132, e.g., relative to the rest of initialization image 130. Furthermore, user's input is considered in some examples, e.g., while identifying initialization image reference points 132. For example, the user specifies initialization code area 135 on code initialization user interface 114, which displays initialization image 130. Initialization image reference points 132 are then identified by code initialization program product 117 based on initialization code area 135, e.g., identifying various contrast features surrounding or proximate to initialization code area 135. Overall, various techniques for identifying initialization image reference points 132 are within the scope.

Initialization image reference points 132 provide reference information, corresponding to distinguishable and unique features. This information allows identifying initialization code area 135 on initialization image 130. In some examples, initialization image reference points 132 are presented as collection of reference coordinates. However, other representations of Initialization image reference points 132 are also within the scope.

In some examples, initialization image reference points 132, identified in initialization image 130, are highlighted on code initialization user interface 114 to provide indication to the user. Furthermore, in some examples, the user is prompted to accept the identified points, to select different and/or additional points, to identify initialization code area 135, and to perform other functions associated with image reference points 132. Finally, in some examples, code initialization user interface 114 informs the user when a sufficient number of initialization image reference points 132 has been identified, e.g., by providing an indicator or a counter on code initialization user interface 114.

As noted above, initialization image reference points 132 are used to identify initialization code area 135, which is later used for placement of VMDQR code 108. In some examples, identifying initialization image reference points 132 comprises identifying initialization code area 135 in initialization image 130 (block 205 in FIG. 2A). For example, initialization code area 135 is at least partially surrounded by initialization image reference points 132. Initialization code area 135 has a uniform background color. This uniformity feature allows for unabstracted view of VMDQR code 108.

In some examples, method 200 further comprises determining a sufficiency level of initialization image reference points 132 (decision block 206 in FIG. 2A). For example, initialization image reference points 132 need to define boundaries of initialization code area 135 with a sufficient certainty. FIG. 1A illustrates an example, where this boundary is rectangular. However, other shapes are also within the scope, including various irregular shapes. In some examples, the number of initialization image reference points 132 depends on the complexity of this shape. Furthermore, the sufficiency level of initialization image reference points 132 depends on detectability of initialization image reference points 132 in initialization image 130, e.g., contrast, size, and like.

Determining the sufficiency level of initialization image reference points 132 is performed prior to transmitting initialization image reference points 132, as further described below. After this sufficiency level meets or exceeds a certain threshold, initialization image reference points 132 are transmitted to code retrieval device 160. In some examples, when the sufficiency level is below this threshold, method 200 comprises requesting an additional initialization image, which is processed in the similar manner as initialization image 130, described above. In some examples, the process of requesting an additional image is repeated a number of times until the sufficiency level meets or exceeds a certain threshold.

Furthermore, in some examples, the sufficiency level of initialization image reference points 132 is determined prior to data set 102 being received. As described below, data set 102 is used in the VMDQR code generation operation. Until initialization code area 135 for placing VMDQR code 108 is determined, there is no need for data set 102. As such, determining the sufficiency level of initialization image reference points 132 sets a threshold for further processing. Overall, this feature prevents premature and, in some examples, unnecessary data collection, e.g., when initialization image reference points 132 are not sufficient for further operations.

Figure 3A:
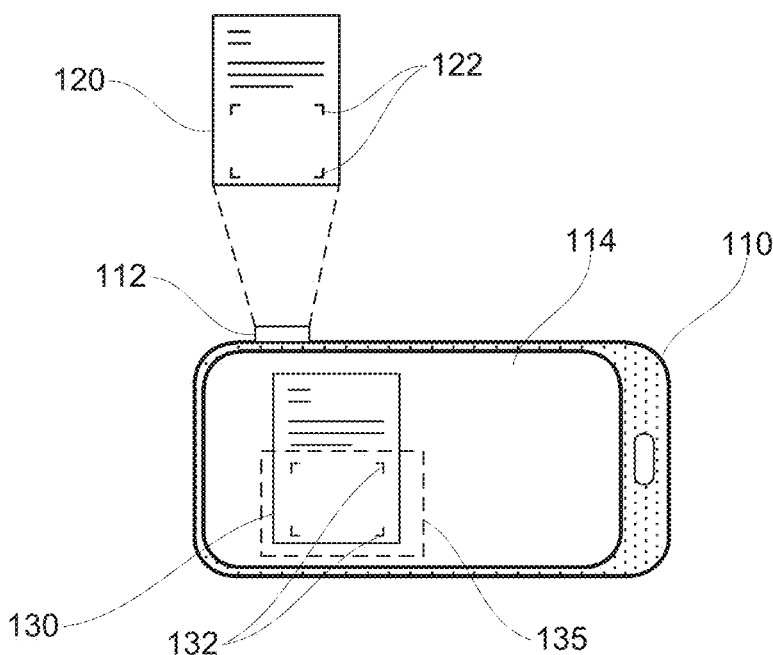
FIG. 3A-FIG. 3C are schematic representations of different stages of using a code initialization device for creating a VMDQR code, in accordance with some examples.
Figure 3B:
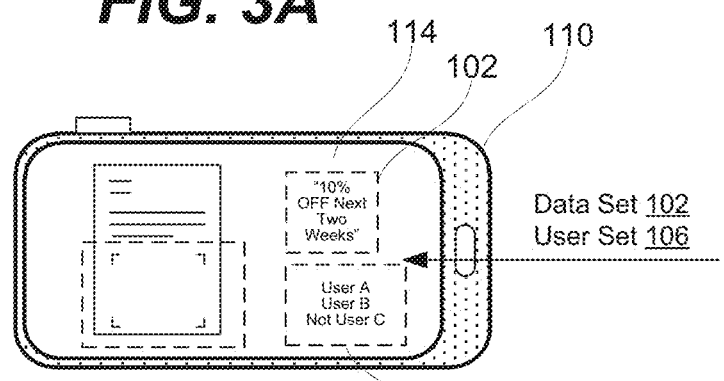

Method 200 comprises a data set receiving operation, during which data set 102 is received at code initialization device 110 (block 210 in FIG. 2A). Data set 102 is associated with initialization object 120. For example, initialization object 120 is a processed part. Data set 102, associated with this part, comprises at least one of a part description, a serial number, a processing date, and the like. In another example, initialization object 120 is an advertisement associated with one or more products sold at a given location. In this example, data set 102 comprises at least one of a product description, discount/sale price, sale start and end dates, and the like. Various other examples of initialization object 120 and data set 102 are within the scope. In some examples, data set 102 is received at code initialization device 110 through code initialization user interface 114 as, for example, is schematically shown in FIG. 3B. For example, a use enters information, forming data set 102, on a touchscreen or a keyboard.

In some examples, the information contained in data set 102 is replaced with new information, without obtaining another initialization image or identifying new initialization image reference points. This feature may be referred to data update for an existing set of initialization image reference points 132. For example, data set 102 is received at code initialization device 110 a number of times (e.g., updates) and this new data set is transmitted to code management device 150 to replace the previous data set stored in code management database 154.

Method 200 comprises a transmission operation, during which initialization image reference points 132 and data set 102 are transmitted to code management device 150 (block 218 in FIG. 2A). Specifically, initialization image reference points 132 and data set 102 are transmitted. Code management device 150 is able to generate VMDQR code 108 based on data set 102 as further described below with reference to FIG. 2B. Furthermore, VMDQR code 108 is associated with initialization image reference points 132, which are operable as a lock for VMDQR code 108. This transmitting operation is performed by code initialization communication module 119 of code initialization device 110.

In some examples, method 200 further comprises a data set receiving operation, during which user set 106 is received at code initialization device 110 (block 212 in FIG. 2A). For example, user set 106 is received using code initialization user interface 114 as schematically shown in FIG. 3B. Method 200 also comprising a user set transmitting operation, during which user set 106 is transmitted to code management device 150 (block 214 in FIG. 2A).

User set 106 identifies one or more users with access to data set 102, encoded into VMDQR code 108. In other words, code management device 150 utilizes this user set 106 when receiving a request for VMDQR code 108 from code retrieval device 160. Specifically, code management device 150 determines if code retrieval device 160 is authorized to receive VMDQR code 108. In some example, user set 106 comprises an inclusionary set, which lists various users authorized to receive VMDQR code 108. In the same or other examples, user set 106 comprises an exclusionary set, which lists various users not authorized to receive VMDQR code 108. For example, VMDQR code 108 corresponds to a promotion that is limited to certain users, e.g., students of a particular school.

In some examples, method 200 further comprises receiving VMDQR code 108 from code management device 150 at code initialization device 110 (block 220 in FIG. 2A) and displaying VMDQR code 108 together with initialization image 130 using code initialization device 110 (block 222 in FIG. 2A). This part of method 200 may be referred to as a feedback or quality control stage, where another user (e.g., a user with scanner 190) is able to see the same interface as a user, who retrieves VMDQR code 108, as further described below with reference to FIG. 2C. Specifically, VMDQR code 108 is displayed on code retrieval user interface 164 as schematically shown in FIG. 3C. VMDQR code 108 is integrated into initialization image 130 thereby forming an augmented image.

In some examples, displaying VMDQR code 108 together with initialization image 130 involves superimposing VMDQR code 108 on initialization image 130 within initialization code area 135 of initialization image 130. In other words, initialization image 130, shown on code initialization user interface 114, is augmented or modified to add VMDQR code 108.

In some examples, method 200 further comprises displaying data set 102 together with VMDQR code 108 and initialization image 130 (block 224 in FIG. 2A). For example, VMDQR code 108 and data set 102 are superimposed on initialization image 130. VMDQR code 108 is positioned within initialization code area 135 of initialization image 130. In some examples, data set 102 is also positioned within initialization code area 135 or adjacent to initialization code area 135.

Examples of Methods Using VMDQR Codes with Code Management Devices

Figure 2B:
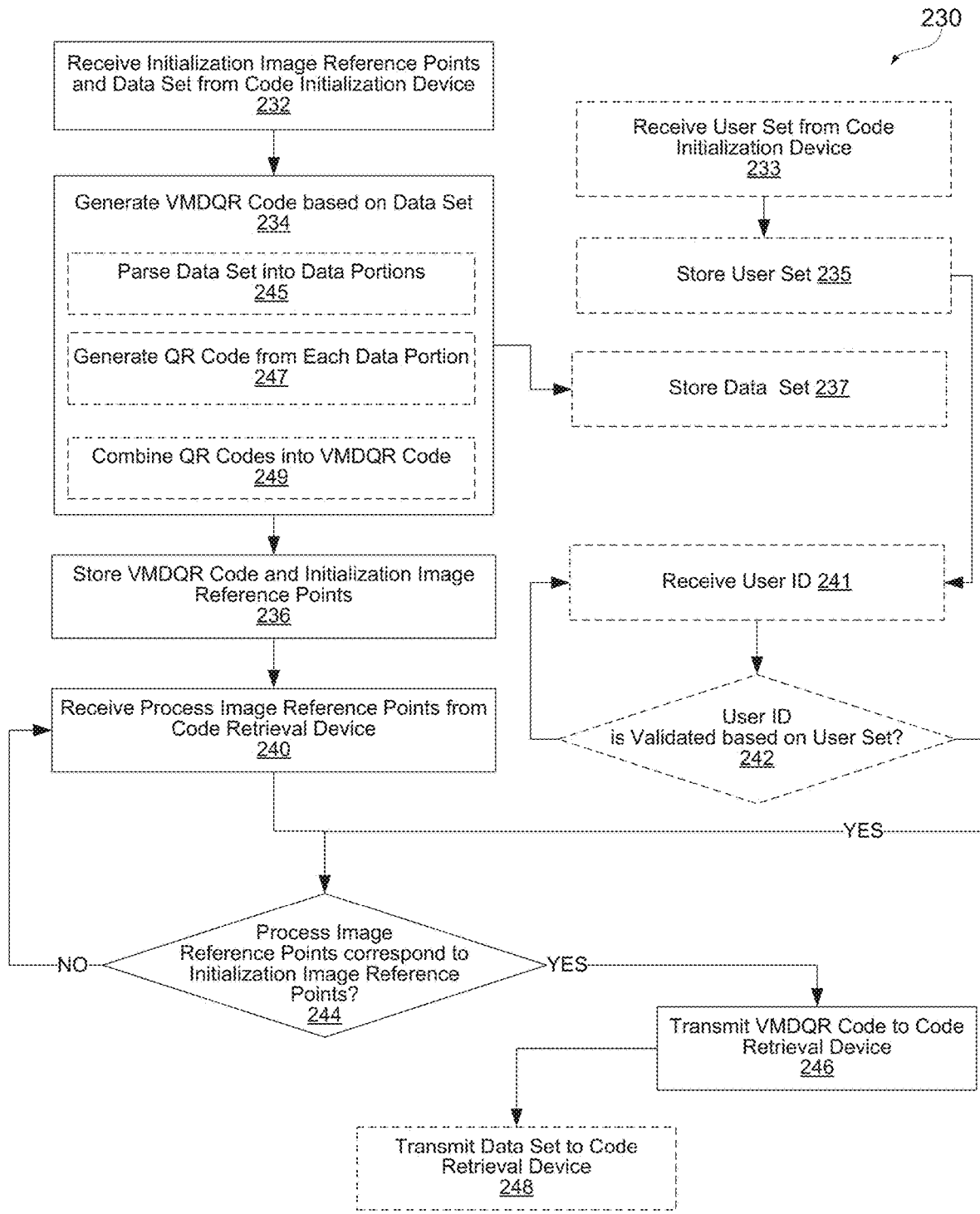

FIG. 2B is a process flowchart corresponding to method 230, in which VMDQR code 108 is used for transferring data set 102 between devices, in accordance with some examples. Various operations of method 230 are performed by code management device 150, some examples of which are described above with reference to FIG. 1A. Method 230 supports various operations of method 200 and method 260 described elsewhere in this disclosure.

Method 230 comprises receiving initialization image reference points 132 and data set 102 from code initialization device 110 (block 232 in FIG. 2B). In some examples, initialization image reference points 132 is a set of reference coordinates. As described above, initialization image reference points 132 are identified by code initialization device 110 from initialization image 130. In some examples, initialization image 130 is also received from code initialization device 110, e.g., together with initialization image reference points 132. For example, code management device 150 retrieves additional information from initialization image 130 and/or stores initialization image 130 in code management database 154.

Method 230 comprises a VMDQR generation operation, during which VMDQR code 108 is generated based on data set 102 (block 234 in FIG. 2B). VMDQR code 108 represents data set 102 and comprises multiple QR codes, each of which corresponds to a different portion of data set 102. By combining multiple QR codes into VMDQR code 108, the data storing capacity of VMDQR code 108 is substantially larger than individual QR codes. Furthermore, VMDQR code 108 is convertible into individual QR codes, e.g., for scanning using a conventional scanner as further described below with reference to FIG. 2C, FIG. 2D, FIG. 2B, FIG. 2C, and FIG. 5D.

In some examples, the VMDQR generating operation comprises parsing data set 102 into at least first data portion 102*a* and second data portion 102*b* (block 245 in FIG. 2B), generating at least first QR code 108*a* based on first data portion 102*a* and, independently, generating second QR code 108*b* based on second data portion 102*b* (block 247 in FIG. 2B), and combing first QR codes, such as first QR code 108*a* and second QR code 108*b*, into VMDQR code 108 (block 249 in FIG. 2B). The data parsing is performed, for example, based on capacity of each individual QR code. In some examples, the dimensionality of VMDQR code 108 (e.g., a number of QR codes forming VMDQR code 108) is determined during this operation, based on the number of data portions generated during parsing. Each data portion is then encoded into a corresponding QR code. VMDQR code 108 represents a collection of multiple QR codes and is visually represented as a 3D object, various examples of which are described above with reference to FIGS. 1 and 1C.

It should be noted that multiple QR codes are combined into VMDQR code 108 (block 249) in accordance with a specific order, which is set by code management device 150. This order later allows code retrieval device 160 to display each QR code in a sequence, to decode all data portions in the same sequence, and to combine the decoded data portion back into data set 102 in a correct order, as further described below with reference to FIG. 2C and FIG. 2D. In some examples, the order, with which multiple QR codes are combined into VMDQR code 108, is the same for all QR codes managed by system 100. Alternatively, the order is unique to each VMDQR code, in which case, the order is also transmitted from code management device 150 to code retrieval device 160 as a part of the VMDQR code transmission operation, described below.

Method 230 comprises storing VMDQR code 108 and initialization image reference points 132 in code management database 154 (block 236 in FIG. 2B). It should be noted VMDQR code 108 corresponds to initialization image reference points 132 in code management database 154 such that initialization image reference points 132 are used in a later operation to identify and retrieve VMDQR code 108.

Method 230 comprises receiving process image reference points 182 from code retrieval device 160 (block 240 in FIG. 2B). As further described below, process image reference points 182 are obtained by code retrieval device 160 from process image 180 of process object 170. In some examples, process object 170 is the same as initialization object 120.

Method 230 comprises determining if process image reference points 182 correspond to initialization image reference points 132 (decision block 244 in FIG. 2B). For example, the reference coordinates of process image reference points 182 are compared with the reference coordinates of initialization image reference points 132 to determine this correspondence. However, other methods of comparing process image reference points 182 and initialization image reference points 132 are within the scope. During this operation, initialization image reference points 132 are operable as a lock for VMDQR code 108, while process image reference points 182 is operable as a key. If there is a sufficient match between process image reference points 182 and initialization image reference points 132, method 230 is allowed to proceed forward. It should be noted that process image reference points 182 need to be sufficiently unique for this correspondence to occur.

Method 230 comprises a VMDQR transmitting operation, during which VMDQR code 108 is transmitted to code retrieval device 160 (block 246 in FIG. 2B). This operation is performed if process image reference points 182 sufficiently correspond to initialization image reference points 132 (the key matches the lock). On the other hand, if process image reference points 182 does not correspond to initialization image reference points 132 or, more generally, to any sets of initialization image reference points in code management database 154, then VMDQR code 108 is not transmitted.

In some examples, method 230 further comprises receiving user set 106 from code initialization device 110 (block 233 in FIG. 2B). It should be noted that user set 106 is associated with data set 102 and, in some examples, determined access to data set 102. More specifically, method 230 proceeds with storing user set 106 in code management database 154 (block 235 in FIG. 2B).

At some point, method 230 comprises receiving user identification 161 from code retrieval device 160 (block 241 in FIG. 2B) and validating user identification 161 based on user set 106 (block 242 in FIG. 2B). Various examples of user identification 161 are within the scope, such as a user name, email address, internet protocol (IP) address, media access control address (MAC) address, and the like. VMDQR code 108 is transmitted to code retrieval device 160 if user identification 161 is validated based on user set 106.

In some examples, method 230 further comprises storing data set 102 in code management database 154 (block 237 in FIG. 2B) and transmitting data set 102 to code retrieval device 160 (block 248 in FIG. 2B). Data set 102 is transmitted, for example, together with VMDQR code 108. Alternatively, data set 102 is retrieved from VMDQR code 108.

Examples of Methods Using VMDQR Codes with Code Retrieval Devices

Figure 2C:
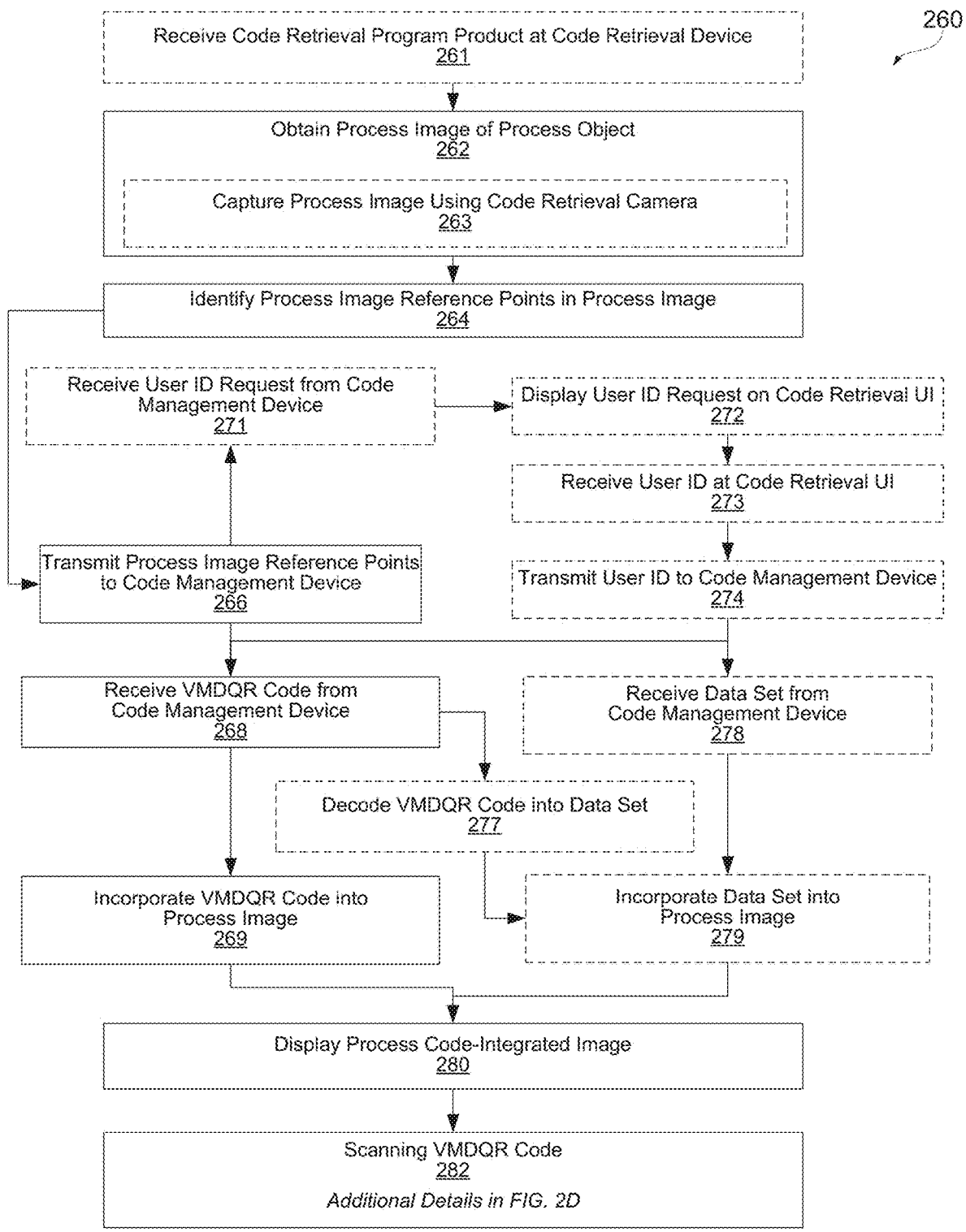
Figure 3C:
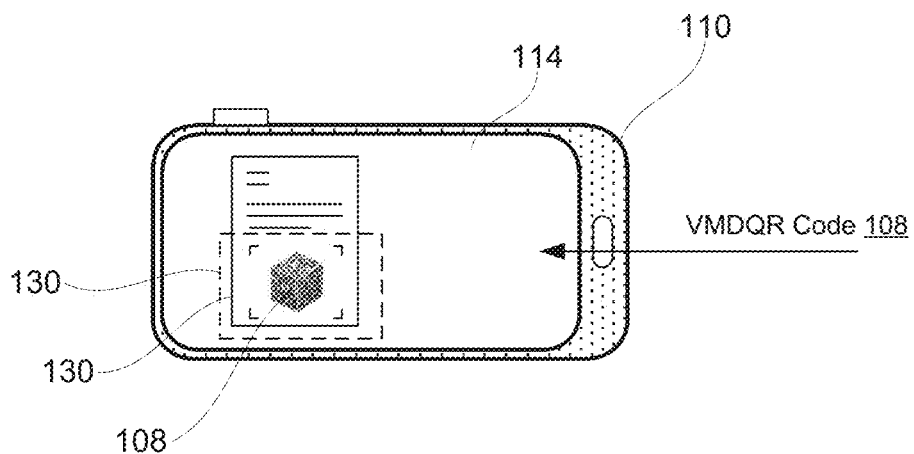

FIG. 2C is a process flowchart corresponding to method 260, in which VMDQR code 108 is used to transfer data set 102 between devices, in accordance with some examples. Method 260 is executed using code retrieval device 160, which is communicatively coupled to code management device 150. Specifically, code retrieval device 160 supports various operations of method 260.

In some examples, method 260 commences with receiving code retrieval program product 167 at code retrieval device 160 (block 261 in FIG. 2C). For example, code retrieval program product 167 is an application, which is downloaded from a server associated with method 200, e.g., code management device 150. The application is installed on code retrieval device 160 and enables various operations of method 260, further described below. Various examples and features of code retrieval device 160 are described above with reference to FIG. 1E.

Figure 4A:
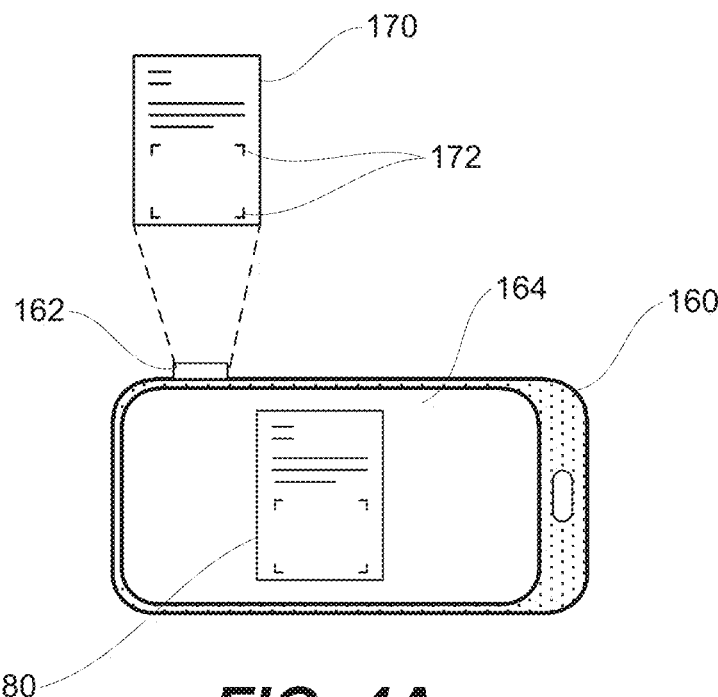
FIG. 4A-FIG. 4C are schematic representations of different stages of using a code retrieval device for retrieving a VMDQR code, in accordance with some examples.

Method 260 comprises obtaining process image 180 of process object 170 at code retrieval device 160 (block 262 in FIG. 2C). For example, this image obtaining operation comprises capturing process image 180 using code retrieval camera 162 of code retrieval device 160 (block 263 in FIG. 2C). Process image 180 is displayed on code retrieval user interface 164 as, for example, is schematically shown in FIG. 4A.

In some examples, a user, operating code retrieval device 160, sees an indication on process object 170 or other received notification about availability of VMDQR code 108, associated with process object 170. In other words, the user is prompted to obtain process image 180 of process object 170 in order to retrieve VMDQR code 108.

Figure 4B:
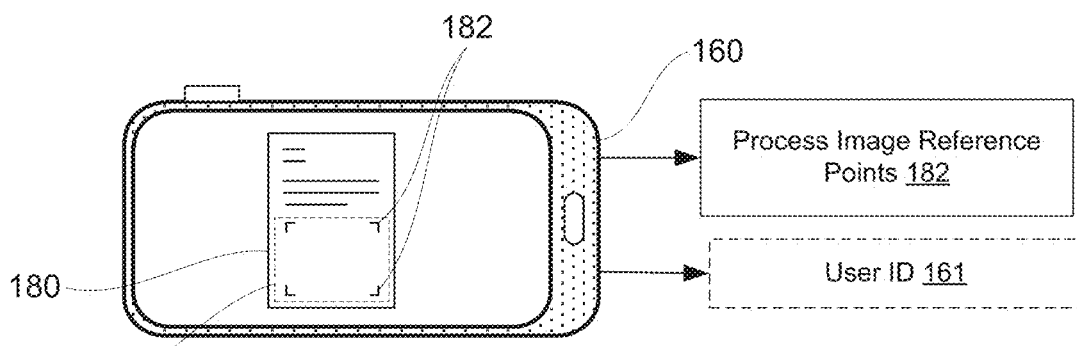

Method 260 comprises identifying process image reference points 182 in process image 180 using code retrieval device 160 (block 264 in FIG. 2C). For examples, various visual features (e.g., lines, corner markings, and the like) can be used as process image reference points 182 as, for example, is schematically shown in FIG. 4B. In some examples, process image reference points 182 are identified based on contrast of process image reference points 182 relative to the rest of process image 180.

As noted above, process image reference points 182 identify process code area 183, which is later used for placement of VMDQR code 108. In some examples, identifying initialization image reference points 132 determines process code area 183 in process image 180. For example, process code area 183 is at least partially surrounded by process image reference points 182. Process code area 183 has a uniform background color. This uniformity feature allows for unabstracted view of VMDQR code 108.

Method 260 comprises a transmitting operations, during which process image reference points 182 are transmitted from code retrieval device 160 to code management device 150 (block 266 in FIG. 2C). Specifically, process image reference points 182 are transmitted for verification from code retrieval device 160 by code management device 150 as, for example, is schematically shown in FIG. 4B. This operation is performed using code retrieval communication module 169 of code retrieval device 160.

In some examples, method 260 further comprises receiving user identification request 107 for user identification 161 from code management device 150 (block 271 in FIG. 2C). For example, VMDQR code 108 is only accessible to selected user devices, identified in user set 106, available at code management device 150. Before code management device 150 is able to transmit VMDQR code 108 to code retrieval device 160, user identification 161 is verified. In some examples, user identification request 107 is received in response to code retrieval device 160 identifying VMDQR code 108, based on process image reference points 182, and also identifying user set 106 associated with VMDQR code 108.

In some examples, method 260 further comprises displaying user identification request 107 on code retrieval user interface 164 of code retrieval device 160 (block 272 in FIG. 2C). Method 260 further comprises receiving user identification 161 at code retrieval user interface 164 (block 273 in FIG. 2C). These operations are performed prior to transmission of user identification 161 and after receiving user identification request 107.

In some examples, method 260 also comprises a user identification transmitting operation, during which user identification 161 is transmitted from code retrieval device 160 to code management device 150 (block 274 in FIG. 2C). User identification 161 is transmitted from code retrieval device 160 for verification by code management device 150 as, for example, is schematically shown in FIG. 4B. In these examples, code management device 150 verifies user identification 161, e.g., if user identification 161 is a part of user set 106. VMDQR code 108 is received based on verification of user identification 161.

Method 260 comprises receiving VMDQR code 108 from code management device 150 at code retrieval device 160 (block 268 in FIG. 2C). This operation is initiated based on the verification of process image reference points 182 by code management device 150 and, in some examples, also based on the verification of user identification 161 by code management device 150. Various examples of VMDQR code 108 and corresponding methods are described above.

Method 260 comprises incorporating VMDQR code 108 into process image 180 (block 269 in FIG. 2C). VMDQR code 108 is incorporated based on process image reference points 182 to generate process code-integrated image 184. For example, the incorporating operation comprises superimposing VMDQR code 108 at process code area 183 of process image 180. Process code area 183 is defined by process image reference points 182.

Figure 4C:
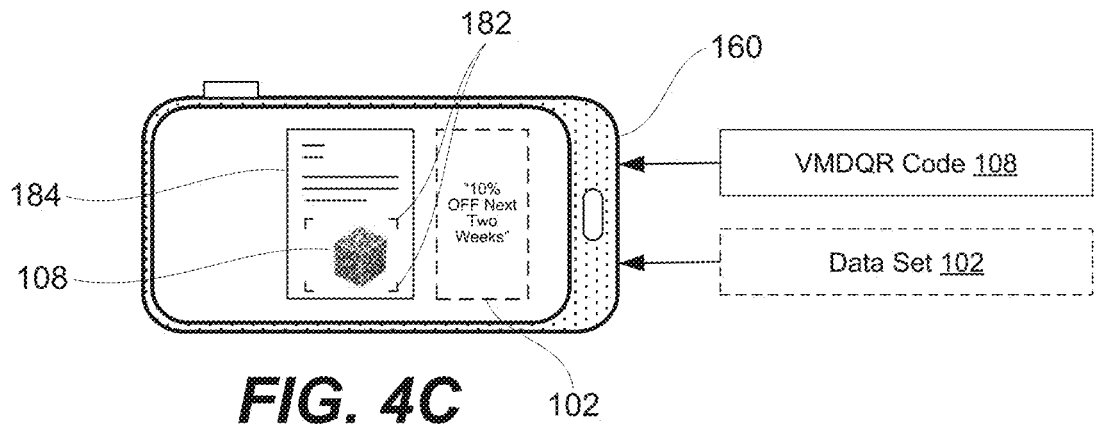

Method 260 comprises displaying process code-integrated image 184 (block 280 in FIG. 2C). Process code-integrated image 184 comprises VMDQR code 108 and is displayed on code retrieval device 160 as, for example, is schematically shown in FIG. 4C and FIG. 5A. In some examples, process code-integrated image 184 is displayed on code retrieval user interface 164 of code retrieval device 160. Displaying VMDQR code 108 as a part of process code-integrated image 184 allows the user to confirm that VMDQR code 108 was successfully received by code retrieval device 160.

In some examples, method 260 further comprises receiving 278 a data set 102 from code management device 150 at code retrieval device 160 (block 278 in FIG. 2C). Data set 102 is encoded into VMDQR code 108. Method 260 further comprises incorporating data set 102 into process image 180 (block 279 in FIG. 2C). This operation generates process code-integrated image 184, which comprises data set 102 and VMDQR code 108.

In some examples, method 260 further comprises decoding VMDQR code 108 (block 277 in FIG. 2C). This decoding operation is performed using code retrieval device 160 and generates data set 102 at code retrieval device 160. This features eliminates the need to transmit data set 102 to code retrieval device 160 and allows presenting data set 102, e.g., on code retrieval user interface 164 of code retrieval device 160.

Method 260 further comprises incorporating data set 102 into process image 180 (block 279 in FIG. 2C). As described above, this operation generates process code-integrated image 184, which, in these examples, comprises both data set 102 and VMDQR code 108. Incorporating data set 102 into process code-integrated image 184 allows the user of code retrieval device 160 to review information in data set 102, e.g., in addition to VMDQR code 108 being scanned. This option allows the user to abort method 260, e.g., and not proceed with the scan of VMDQR code 108.

In some examples, method 260 further comprising a VMDQR scanning operation, during which VMDQR code 108 is scanned and displayed on code retrieval device 160 (block 282 in FIG. 2C). As noted above, VMDQR code 108 comprises multiple QR codes, such as first QR code 108a and second QR code 108b. If a regular QR scanner is used for scanning, each individual QR code is presented on code retrieval user interface 164, e.g., for a set of period of time, until further input from the user. Code retrieval device 160 or, more specifically, code retrieval program product 167 comprises an algorithm of the order of retrieving and displaying each individual QR code of VMDQR code 108. For example, code retrieval program product 167 has instructions to display first QR code 108a initially, followed by displaying second QR code 108b, and so on. This QR code displaying order allows structuring the decoded information in the same was as in data set 102.

In some example, this QR code displaying order is preset in code retrieval program product 167. In other words, this QR code displaying order is the same for all VMDQR codes, handled by system 100. Alternatively, this QR code displaying order is transmitted from code management device 150 to code retrieval device 160 and, in some example, is specific to VMDQR code 108, also transmitted from code management device 150 to code retrieval device 160.

Figure 2D:
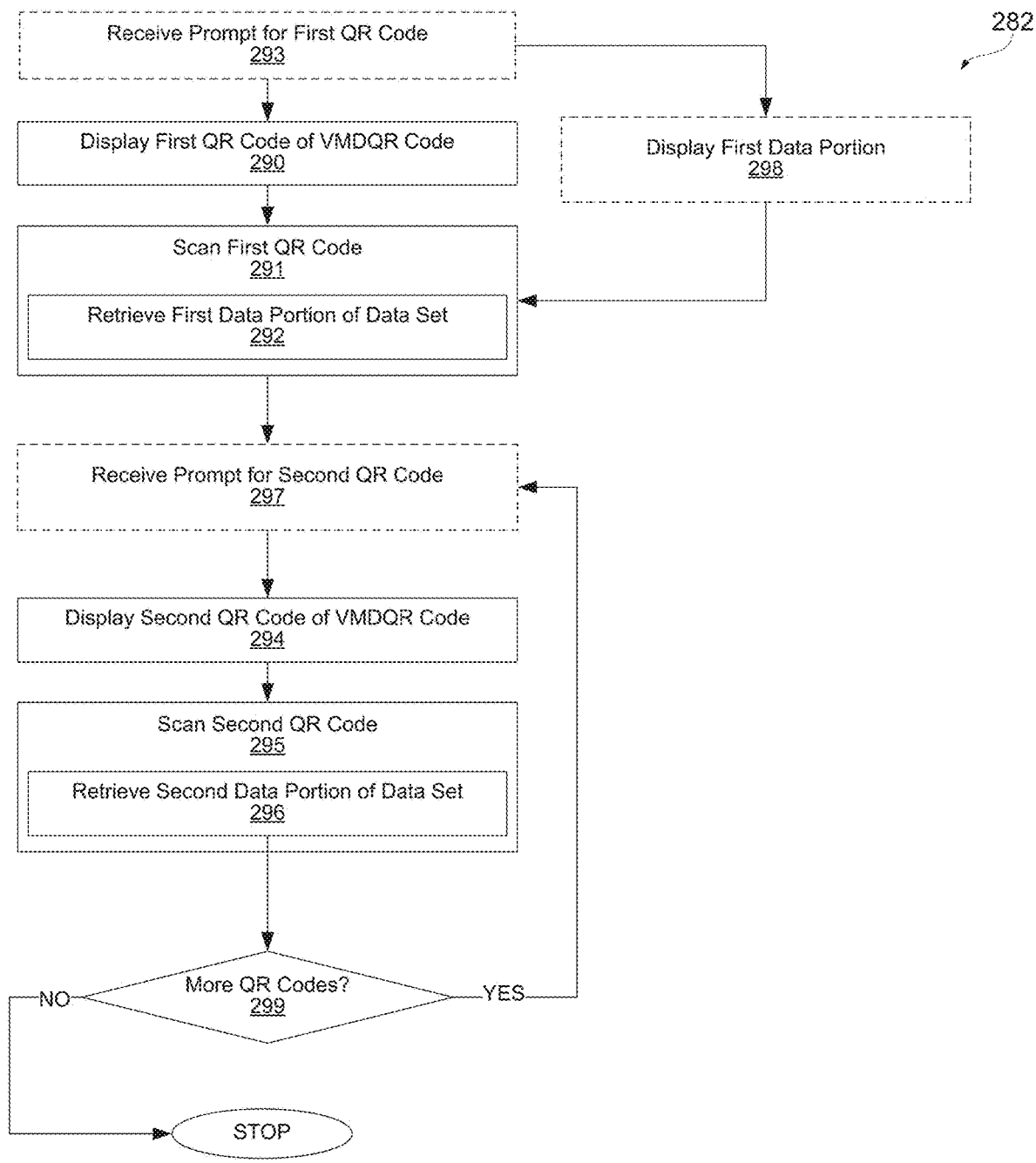

More specifically, the scanning operation comprises first QR code 108a being displayed on code retrieval device 160 (block 290 in FIG. 2D). In some examples, displaying first QR code 108a comprising rotating VMDQR code 108, such that the face of the 3D image, representing VMDQR code 108, is parallel to code retrieval user interface 164 as, for example, is schematically shown in FIG. 5B. This orientation provides the best angle for scanning. When first QR code 108a is displayed on code retrieval user interface 164, other QR codes of VMDQR code 108 are visible there by reducing scanning errors.

In some examples, prior to first QR code 108a being displayed, receiving prompt for displaying first QR code 108a (block 293 in FIG. 2D). For example, VMDQR code 108 is first displayed on code retrieval user interface 164 for the user, e.g., to confirm that VMDQR code 108 has been successfully received at code retrieval device 160, product/service promotion, and other like reasons. The orientation of VMDQR code 108 during this operation is selected for user's viewability as, for example, is schematically shown in FIG. 5A. Once the user has viewed VMDQR code 108 or, more specifically, process code-integrated image 184 comprising VMDQR code 108, the used prompts code retrieval device 160 to proceed with the next operation. The prompt is received through code retrieval user interface 164.

The VMDQR code scanning operation also comprises a QR code scanning operation, during which first QR code 108a is scanned (block 291 in FIG. 2D). This operation is performed using scanner 190, operable to scan QR codes. This first QR code scanning operation is performed while first QR code 108a is displayed on code retrieval device 160 as, for example, is schematically shown in FIG. 5B. More specifically, during this operation, first QR code 108a is positioned parallel to the surface of code retrieval user interface 164, thereby enabling the scanning.

In some examples, the scanning operation comprises retrieving first data portion 102a of data set 102 encoded in VMDQR code 108 (block 292 in FIG. 2D). Scanner 190 retrieves information, representing first data portion 102a, from first QR code 108a and, in some examples, stores first data portion 102a in the scanner memory. In some examples, first data portion 102a is then combined with other data portions.

The scanning operation further comprises displaying second QR code 108b of VMDQR code 108 on code retrieval device 160 (block 294 in FIG. 2D). For example, VMDQR code 108 is rotated (e.g., 90°, 180°, etc.) to show another face of VMDQR code 108, which comprises second QR code 108b. In some examples, during this operation, second QR code 108b is positioned parallel to the surface of code retrieval user interface 164 as, for example, is shown in FIG. 5C.

During the overall scanning operation, second QR code 108b is also scanned (block 295 in FIG. 2D). Specifically, second QR code 108b is scanned while second QR code 108b is displayed on code retrieval device 160. This operation is performed using scanner 190, operable to scan QR codes. In some examples, scanner 190 used in this operation is the same as the scanner used for scanning other QR codes of VMDQR code 108.

In some examples, this scanning operation comprises retrieving second data portion 102b of data set 102 encoded in VMDQR code 108 (block 296 in FIG. 2D). Second data portion 102b is decoded by scanner 190 from second QR code 108b and, in some examples, stores second data portion 102b in the scanner memory. In some examples, second data portion 102b is then combined with other data portions.

Overall, displaying and scanning are repeated a number of times, corresponding to a dimensionality of VMDQR code 108 (block 299 in FIG. 2D). For example, all QR codes of VMDQR code 108 are scanned by repeating these displaying and scanning operations. For example, FIG. 5D illustrates third QR code 108c being displayed (on code retrieval user interface 164) and scanned (by scanner 190) to decode third data portion 102c.

In some examples, method 260 further comprises displaying first data portion 102a of data set 102 encoded in VMDQR code 108 (block 298 in FIG. 2D). Specifically, first data portion 102a is displayed together with first QR code 108a on code retrieval user interface 164 as, for example, schematically shown in FIG. 5B. First data portion 102a is displayed to relate this information to the user or another person with a viewing access to code retrieval device 160 (e.g., a person with scanner 190). First data portion 102a is used, for example, when first QR code 108a cannot be scanned (e.g., scanner 190 is not operational).

It should be noted that, in some examples, first QR code 108a, second QR code 108b, and third QR code 108c are scanned in any order. Furthermore, at least one of QR code of VMDQR code 108 is not scanned in some examples, e.g., data portion encoded on this QR code is not needed. Furthermore, in some examples, method 260 comprises combining different data portions, e.g., decoded by scanner 190, and forming data set 102.

Computer System Examples

FIG. 5 illustrates computer system 1300 and computer program product 1322, configured in accordance with some examples. Various components of system 100, such as code initialization device 110, code management device 150, and code retrieval device 160, described above are implementable as and supportable by components of computer system 1300 and computer program product 1322.

In various examples, computer system 1300 includes communications framework 1302, which provides communications between processor unit 1304, memory 1306, persistent storage 1308, communication unit 1310, input/output unit 1312, and display 1314. In this example, communications framework 1302 takes form of a bus system.

Processor unit 1304 serves to execute instructions for software that is loaded into memory 1306. Memory 1306 and persistent storage 1308 are examples of storage devices 1316. A storage device is any piece of hardware capable of storing information, such as, for example, without limitation, data, program code in functional form, and/or other suitable information either on a temporary basis and/or a permanent basis. Storage devices 1316 are also referred to as computer readable storage devices in these illustrative examples. Memory 1306, in these examples, is a random access memory or any other suitable volatile or non-volatile storage device. Persistent storage 1308 takes various forms, depending on implementation. For example, persistent storage 1308 is a hard drive, a flash memory, a rewritable optical disk, a rewritable magnetic tape, or some combination of above. Media used by persistent storage 1308 is removable, in some examples.

Communications unit 1310, in these illustrative examples, provides for communications with other computer systems or devices. In these illustrative examples, communications unit 1310 is a network interface card, universal serial bus (USB) interface, or other suitable communications device/interface.

Input/output unit 1312 allows for input and output of data with other devices that are connected to computer system 1300. For example, input/output unit 1312 provides a connection for user input through a keyboard, a mouse, and/or some other suitable input device. Further, input/output unit 1312 sends output to a printer. Display 1314 provides a mechanism to display information to a user.

In some examples, instructions for an operating system, applications, and/or programs are located in storage devices 1316, which are in communication with processor unit 1304 through communications framework 1302. Processes of different examples are performed by processor unit 1304 using computer-implemented instructions, which are located in a memory, such as memory 1306.

These instructions are referred to as program code, computer usable program code, or computer readable program code that is read and executed by a processor in processor unit 1304. Program code in different examples is embodied on different physical or computer readable storage media, such as memory 1306 or persistent storage 1308.

Program code 1318 is located in a functional form on computer readable media 1320 that is selectively removable and is loaded onto or transferred to computer system 1300 for execution by processor unit 1304. Program code 1318 and computer readable media 1320 form or provide computer program product 1322 in these illustrative examples. In one example, computer readable media 1320 is or includes computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 is transferred to computer system 1300 using computer readable signal media 1326. Computer readable signal media 1326 is, for example, a propagated data signal, containing program code 1318. For example, computer readable signal media 1326 is an electromagnetic signal, an optical signal, and/or any other suitable type of signal. These signals are transmitted over communications links, such as wireless communications links, optical fiber cable, coaxial cable, a wire, and/or any other suitable type of communications link.

The different components illustrated for computer system 1300 are not meant to provide architectural limitations to manner in which different examples are implemented. Different illustrative examples are implemented in a computer system including components in addition to and/or in place of those illustrated for computer system 1300. Other components shown in FIG. 5 can be varied from illustrative examples shown.

Aircraft Examples

In some examples, methods and systems described above are used on aircraft and, more generally, by the aerospace industry. Specifically, these methods and systems can be used during fabrication of aircraft as well as during aircraft service and maintenance.

Figure 7:
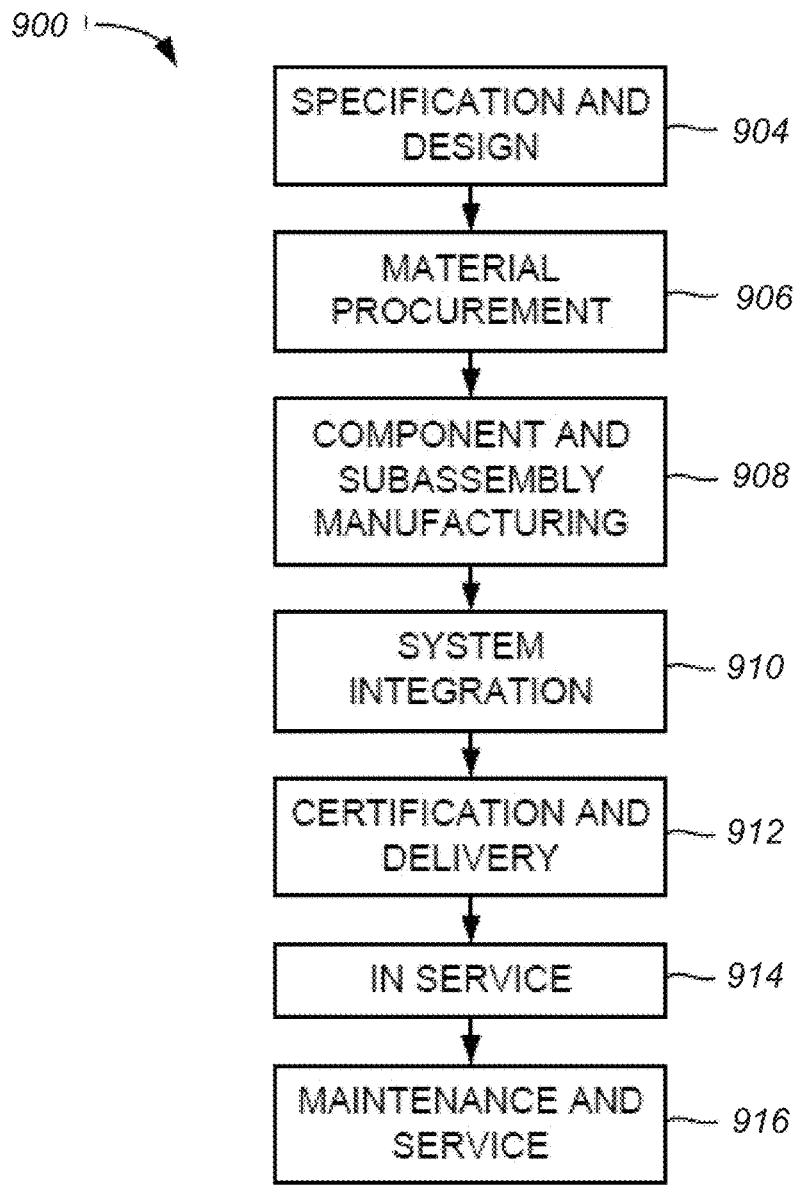
FIG. 7 is a process flowchart corresponding to a method for manufacturing and service the aircraft.
Figure 8:
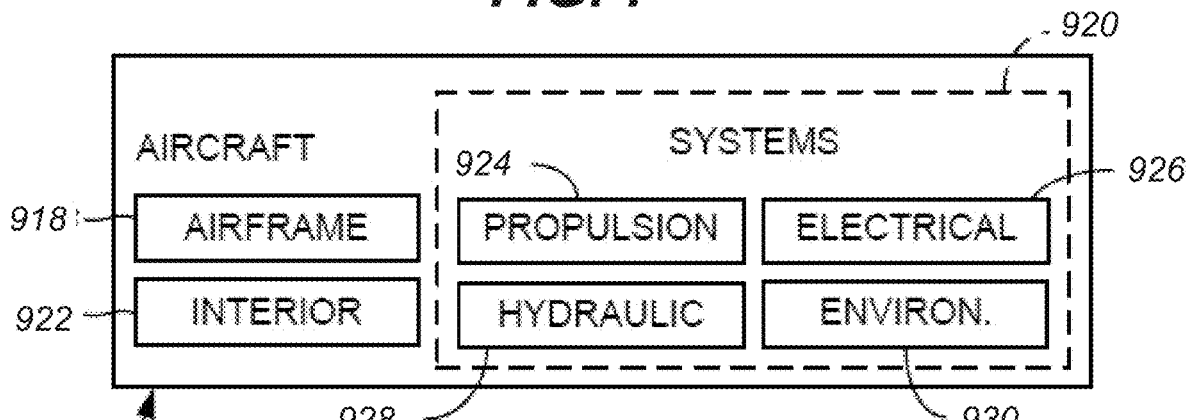
FIG. 8 illustrates a block diagram of an example of an aircraft, in accordance with some examples.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, description includes examples according to following clauses:

Clause 1. Method 260 of using VMDQR code 108, method 260 comprising:
obtaining process image 180 of process object 170 at code retrieval device 160;
identifying process image reference points 182 in process image 180 using code retrieval device 160;
transmitting process image reference points 182 from code retrieval device 160 to code management device 150, for verification by code management device 150;
based on verification of process image reference points 182 by code management device 150, receiving VMDQR code 108 from code management device 150 at code retrieval device 160; and
incorporating VMDQR code 108 into process image 180 based on process image reference points 182 to generate process code-integrated image 184; and
displaying process code-integrated image 184, comprising VMDQR code 108, on code retrieval device 160.

Clause 2. Method 260 of clause 1, wherein obtaining process image 180 comprises capturing process image 180 using code retrieval camera 162 of code retrieval device 160.

Clause 3. Method 260 of any one of clauses 1-2, wherein at least some of process image reference points 182 surround process code area 183 in process image 180.

Clause 4. Method 260 of clause 3, wherein process code area 183 has a uniform background color.

Clause 5. Method 260 of any one of clauses 1-4, further comprising transmitting user identification 161 from code retrieval device 160 to code management device 150, for verification by code management device 150, wherein VMDQR code 108 is received based on verification of user identification 161.

Clause 6. Method 260 of clause 5, further comprising, prior to transmitting user identification 161, receiving user identification request 107 for user identification 161 from code management device 150, wherein user identification request 107 is generated based on verification of process image reference points 182 by code management device 150.

Clause 7. Method 260 of clause 6, further comprising, prior to transmitting user identification 161 and after receiving user identification request 107, displaying user identification request 107 on code retrieval user interface 164 of code retrieval device 160 and receiving user identification 161 at code retrieval user interface 164.

Clause 8. Method 260 of any one of clauses 1-7, wherein process code-integrated image 184, comprising VMDQR code 108, is displayed on code retrieval user interface 164 of code retrieval device 160.

Clause 9. Method 260 of any one of clauses 1-8, wherein incorporating VMDQR code 108 into process image 180 comprises superimposing VMDQR code 108 at process code area 183 of process image 180, process code area 183 defined by process image reference points 182.

Clause 10. Method 260 of any one of clauses 1-9, further comprising:
receiving data set 102 from code management device 150 at code retrieval device 160, data set 102 being encoded into VMDQR code 108; and
incorporating data set 102 into process image 180 to generate process code-integrated image 184, wherein process code-integrated image 184, displayed at code retrieval device 160, comprises data set 102 and VMDQR code 108.

Clause 11. Method 260 of any one of clauses 1-10, further comprising:
decoding VMDQR code 108 using code retrieval device 160 to generate data set 102 at code retrieval device 160; and
incorporating data set 102 into process image 180 to generate process code-integrated image 184, wherein process code-integrated image 184, displayed at code retrieval device 160, comprises data set 102 and VMDQR code 108.

Clause 12. Method 260 of any of one of clauses 1-11, further comprising scanning VMDQR code 108 displayed on code retrieval device 160.

Clause 13. Method 260 of clause 12, wherein scanning VMDQR code 108 comprises:
displaying first QR code 108a of VMDQR code 108 on code retrieval device 160;
scanning first QR code 108a, while displayed on code retrieval device 160;
displaying second QR code 108b of VMDQR code 108 on code retrieval device 160; and
scanning second QR code 108b, while displayed on code retrieval device 160.

Clause 14. method 260 of clause 13, wherein:
scanning first QR code 108a comprises retrieving 292 first data portion 102a of data set 102 encoded in VMDQR code 108; and
scanning second QR code 108b comprises retrieving 296 second data portion 102b of data set 102 encoded in VMDQR code 108.

Clause 15. Method 260 of clause 13, wherein displaying and scanning are repeated a number of times, corresponding to a dimensionality of VMDQR code 108.

Clause 16. Method 260 of clause 13, wherein, prior to displaying first QR code 108*a*, receiving 293 a prompt for displaying first QR code 108*a*.

Clause 17. Method 260 of clause 16, wherein the prompt for displaying first QR code 108*a* is received through a code retrieval user interface 164

Clause 18. Method 260 of clause 13, further comprising displaying 298 first data portion 102*a* of data set 102 encoded in VMDQR code 108.

Clause 19. Method 260 of clause 18, wherein first data portion 102*a* is displayed together with first QR code 108*a*.

Clause 20. Method 260 of any one of clauses 1-19, wherein displaying first Quick Response QR code 108*a* comprising rotating VMDQR code 108.

Clause 21. Method 200 of using VMDQR code 108, method 200 comprising:

obtaining initialization image 130 of initialization object 120 at code initialization device 110, initialization object 120 comprising initialization object reference points 122;

identifying initialization image reference points 132 in initialization image 130 using code initialization device 110, initialization image reference points 132 corresponding to initialization object reference points 122;

receiving data set 102 at code initialization device 110, data set 102 associated with initialization object 120; and transmitting initialization image reference points 132 and data set 102 to a code management device 150 for generating VMDQR code 108 based on data set 102 and for positioning VMDQR code 108 in accordance with initialization image reference points 132.

Clause 22. Method 200 of clause 21, further comprising, prior to transmitting initialization image reference points 132, determining 206 a sufficiency level of initialization image reference points 132.

Clause 23. Method 200 of clause 22, wherein the sufficiency level of initialization image reference points 132 is determined prior to receiving data set 102.

Clause 24. Method 200 of clause 22, further comprising, when the sufficiency level is below a threshold, requesting an additional initialization image.

Clause 25. Method 200 of any one of clauses 21-24, wherein identifying initialization image reference points 132 comprises identifying initialization code area 135 in initialization image 130 for positioning VMDQR code 108.

Clause 26. Method 200 of clause 25, wherein initialization code area 135 is at least partially surrounded by initialization image reference points 132.

Clause 27. Method 200 of clause 25, wherein initialization code area 135 has a uniform background color.

Clause 28. Method 200 of any one of clauses 21-27, wherein initialization image 130 is obtained using code initialization camera 112 of code initialization device 110.

Clause 29. Method 200 of any one of clauses 21-28, further comprising:

receiving user set 106 at code initialization device 110;

transmitting user set 106 to code management device 150, wherein user set 106 identifies one or more users with access to data set 102, encoded into VMDQR code 108.

Clause 30. Method 200 of any one of clauses 21-29, further comprising:

receiving VMDQR code 108 from code management device 150 at code initialization device 110; and displaying VMDQR code 108 together with initialization image 130 using code initialization device 110.

Clause 31. Method 200 of clause 30, further comprising displaying data set 102 together with VMDQR code 108 and initialization image 130.

Clause 32. Method 230 of using VMDQR code 108, method 230 comprising:

receiving initialization image reference points 132 and data set 102 from code initialization device 110;

generating VMDQR code 108 based on data set 102;

storing VMDQR code 108 and initialization image reference points 132 in code management database 154;

receiving process image reference points 182 from a code retrieval device 160;

determining if process image reference points 182 corresponds to initialization image reference points 132; and if process image reference points 182 correspond to initialization image reference points 132, transmitting VMDQR code 108 to code retrieval device 160.

Clause 33. Method 230 of clause 32, further comprising:

receiving user set 106 from code initialization device 110, user set 106 associated with data set 102;

storing user set 106 in code management database 154; and receiving user identification 161 from code retrieval device 160;

validating user identification 161 based on user set 106, wherein VMDQR code 108 is transmitted to code retrieval device 160 if user identification 161 is validated based on user set 106.

Clause 34. Method 230 of any one of clauses 32-33, further comprising:

storing data set 102 in code management database 154;

transmitting data set 102 to code retrieval device 160, together with VMDQR code 108.

Clause 35. Method 230 of any one of clauses 32-34, wherein initialization image reference points 132 is a set of reference coordinates.

Clause 36. Method 230 of any one of clauses 32-35, wherein generating VMDQR code 108 comprises:

parsing data set 102 into at least a first data portion 102*a* and a second data portion 102*b*;

generating at least a first QR code 108*a* based on first data portion 102*a* and a second QR code 108*b* based on second data portion 102*b*;

combing at least first QR code 108*a* and second QR code 108*b* into VMDQR code 108.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method of using a Virtual Multi-Dimensional Quick Response (VMDQR) code, the method comprising:

obtaining a process image of a process object at a code retrieval device;

identifying process image reference points on the process object in the process image using the code retrieval device;

transmitting the process image reference points from the code retrieval device to a code management device, for verification by the code management device;

based on the verification of the process image reference
points by the code management device, receiving the
VMDQR code from the code management device at the
code retrieval device;
incorporating the VMDQR code into the process image
based on the process image reference points to generate
a process code-integrated image; and
displaying the process code-integrated image, comprising
the VMDQR code, on the code retrieval device.

2. The method of claim 1, wherein obtaining the process image comprises capturing the process image using a code retrieval camera of the code retrieval device.

3. The method of claim 1, wherein at least some of the process image reference points surround a process code area in the process image.

4. The method of claim 3, wherein the process code area has a uniform background color.

5. The method of claim 1, further comprising transmitting a user identification from the code retrieval device to the code management device, for verification by the code management device, wherein the VMDQR code is received based on the verification of the user identification.

6. The method of claim 5, further comprising, prior to transmitting the user identification, receiving a user identification request for the user identification from the code management device, wherein the user identification request is generated based on the verification of the process image reference points by the code management device.

7. The method of claim 6, further comprising, prior to transmitting the user identification and after receiving the user identification request,
displaying the user identification request on a code retrieval user interface of the code retrieval device; and
receiving the user identification at the code retrieval user interface.

8. The method of claim 1, wherein the process code-integrated image, comprising the VMDQR code, is displayed on a code retrieval user interface of the code retrieval device.

9. The method of claim 1, wherein incorporating the VMDQR code into the process image comprises superimposing the VMDQR code at a process code area of the process image, the process code area defined by the process image reference points.

10. The method of claim 1, further comprising:
receiving a data set from the code management device at the code retrieval device, the data set being encoded into the VMDQR code; and
incorporating the data set into the process image to generate the process code-integrated image, wherein the process code-integrated image, displayed at the code retrieval device, comprises the data set and the VMDQR code.

11. The method of claim 1, further comprising:
decoding the VMDQR code using the code retrieval device to generate a data set at the code retrieval device; and
incorporating the data set into the process image to generate the process code-integrated image, wherein the process code-integrated image, displayed at the code retrieval device, comprises the data set and the VMDQR code.

12. The method of claim 1, further comprising scanning the VMDQR code displayed on the code retrieval device.

13. The method of claim 12, wherein scanning the VMDQR code comprises:
displaying a first QR code of the VMDQR code on the code retrieval device;
scanning the first QR code, while displayed on the code retrieval device;
displaying a second QR code of the VMDQR code on the code retrieval device; and
scanning the second QR code, while displayed on the code retrieval device.

14. The method of claim 13, wherein:
scanning the first QR code comprises retrieving a first data portion of a data set encoded in the VMDQR code; and
scanning the second QR code comprises retrieving a second data portion of the data set encoded in the VMDQR code.

15. The method of claim 13, wherein displaying and scanning are repeated a number of times, corresponding to a dimensionality of the VMDQR code.

16. The method of claim 13, wherein, prior to displaying the first QR code, receiving a prompt for displaying the first QR code.

17. The method of claim 16, wherein the prompt for displaying the first QR code is received through a code retrieval user interface.

18. The method of claim 13, further comprising displaying a first data portion of a data set encoded in the VMDQR code.

19. A method of using a Virtual Multi-Dimensional Quick Response (VMDQR) code, the method comprising:
obtaining an initialization image of an initialization object at a code initialization device, the initialization object comprising initialization object reference points;
identifying initialization image reference points on the initialization object in the initialization image using the code initialization device, the initialization image reference points corresponding to the initialization object reference points;
receiving a data set at the code initialization device, the data set associated with the initialization object; and
transmitting the initialization image reference points and the data set to a code management device for generating the VMDQR code based on the data set and for positioning the VMDQR code in accordance with the initialization image reference points.

20. A method of using a Virtual Multi-Dimensional Quick Response (VMDQR) code, the method comprising:
receiving initialization image reference points of an initialization object and a data set from a code initialization device;
generating the VMDQR code based on the data set;
storing the VMDQR code and the initialization image reference points in a code management database;
receiving process image reference points of a process object from a code retrieval device;
determining if the process image reference points corresponds to the initialization image reference points; and
if the process image reference points correspond to the initialization image reference points, transmitting the VMDQR code to the code retrieval device.

* * * * *